(12) United States Patent
Lai et al.

(10) Patent No.: US 7,914,863 B2
(45) Date of Patent: Mar. 29, 2011

(54) LIQUID CRYSTAL ALIGNMENT SOLUTION

(75) Inventors: Ming-Chih Lai, Taichung County (TW); Wen-Chung Chu, Kaohsiung County (TW); Chin-Wen Chang, Tainan (TW); Min-Ruei Tsai, Kaohsiung (TW)

(73) Assignee: Daxin Material Corporation, Hsinchu County (TW)

( * ) Notice: Subject to any disclaimer, the term of this patent is extended or adjusted under 35 U.S.C. 154(b) by 36 days.

(21) Appl. No.: 12/357,358

(22) Filed: Jan. 21, 2009

(65) Prior Publication Data

US 2009/0194737 A1 Aug. 6, 2009

(30) Foreign Application Priority Data

Feb. 1, 2008 (TW) .................. 97103937 A

(51) Int. Cl.
- *C09K 19/56* (2006.01)
- *G02F 1/1337* (2006.01)
- *C08G 73/14* (2006.01)
- *C08L 79/08* (2006.01)

(52) U.S. Cl. ..... 428/1.2; 428/1.25; 428/1.26; 252/299.4

(58) Field of Classification Search ............... 428/1.2, 428/1.25, 1.26; 252/299.4
See application file for complete search history.

(56) References Cited

U.S. PATENT DOCUMENTS

| | | | |
|---|---|---|---|
| 5,969,055 A | 10/1999 | Nishikawa et al. | |
| 6,685,997 B1 | 2/2004 | Murata et al. | |
| 6,716,270 B2 * | 4/2004 | Ding et al. | ........................ 95/45 |
| 6,946,169 B1 | 9/2005 | Tanioka et al. | |
| 7,189,488 B2 | 3/2007 | Yamanaka et al. | |

FOREIGN PATENT DOCUMENTS

| | | |
|---|---|---|
| JP | 05295115 | 11/1993 |
| JP | 10168455 | 6/1998 |
| JP | 2002040438 | 2/2002 |

* cited by examiner

Primary Examiner — Shean C Wu
(74) Attorney, Agent, or Firm — Jianq Chyun IP Office

(57) ABSTRACT

A liquid crystal alignment solution is provided. The liquid crystal alignment solution includes a first polyimide-polyamide acid and a second polyimide-polyamide acid. The first polyimide-polyamide acid is represented by formula (A),

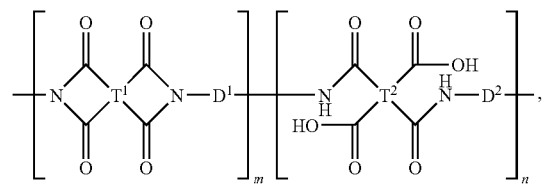

(A)

and the second polyimide-polyamide acid is represented by formula (B),

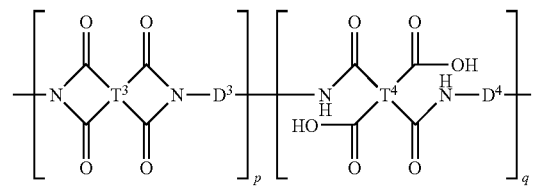

(B)

in which $T^1$, $T^2$, $T^3$ and $T^4$ are each independently a tetravalent residue of a tetracarboxylic acid dianhydride; $D^1$, $D^2$, $D^3$ and $D^4$ are each independently a divalent residue of a diamine; and m, n, p and q are each independently an positive integer, wherein $m/(m+n) \leqq 0.5$ and $p/(p+q) \geqq 0.5$.

8 Claims, No Drawings

LIQUID CRYSTAL ALIGNMENT SOLUTION

CROSS-REFERENCE TO RELATED APPLICATION

This application claims the priority benefit of Taiwan application serial no. 97103937, filed on Feb. 1, 2008. The entirety of the above-mentioned patent application is hereby incorporated by reference herein and made a part of specification.

BACKGROUND OF THE INVENTION

1. Field of Invention

The present invention relates to a liquid crystal alignment solution and more particularly to a liquid crystal alignment solution which can enhance the performance of a liquid crystal display device.

2. Description of Related Art

A liquid crystal display (LCD) is a display device utilizing the characteristics of liquid crystal molecules. The orientation of liquid crystal molecules is changed as an electric field changes so as to control the light transmitted through the liquid crystal layer to produce an image. The liquid crystal display becomes the mainstream in recent years due to the advantages of small volume, light weight, low power consumption and good display quality.

The main fabrication process of the liquid crystal display includes fabricating a liquid crystal panel and assembling a liquid crystal module (LCM). The method of forming the liquid crystal panel mainly includes sealing liquid crystal molecules between a color filter serving as an upper substrate and a thin film transistor (TFT) serving as a lower substrate. It is important for the liquid crystal display to have the long axial direction of liquid crystal molecules aligned with the surface of the substrate at a pre-tilt angle uniformly. The material which can orient liquid crystal molecules at a pre-tilt angle is called an alignment layer.

Two typical fabrication methods of forming the alignment layer are known in the industry. The first method is forming an inorganic film by steam depositing an inorganic material. For example, the film is formed by an oblique angle deposition of silicon oxide on a substrate, and liquid crystal molecules are oriented in the direction of deposition. The above-mentioned method can obtain a uniform orientation of liquid crystal molecules, but it does not meet the economics of industry. The second method is coating an organic film on the surface of a substrate, and then rubbing the organic film by a cloth (cotton, nylon or polyester) to determine the orientation; thus, liquid crystal molecules are oriented in the direction of rubbing. This method is simple and easy to obtain a uniform orientation of liquid crystal molecules, so it is widely used in the industry. The polymer for forming the organic film is polyvinylalcohol (PVA), polyethylene oxide (PEO), polyamide (PA) or polyimide (PI), for example. Due to the chemical resistance and thermal stability, polyimide is the most frequently used material as an alignment layer.

Conventionally, when a voltage is applied to a liquid crystal display device, the ionic electrons are absorbed by the alignment layer. However, when the voltage is interrupted, the ionic electrons are not separated from the alignment layer completely so that the remaining image is resulted. Therefore, the recent development of the alignment layer material mainly focuses on improving the remaining image issue.

SUMMARY OF THE INVENTION

Accordingly, the present invention provides a liquid crystal alignment solution, and the formed liquid crystal alignment layer has the characteristics of stable pre-tilt angle, high voltage holding ratio (VHR), lower residual direct current (RDC), good rubbing property and high reliability.

The present invention also provides a liquid crystal alignment solution which can enhance the performance of a liquid crystal display device.

The present invention provides a first liquid crystal alignment solution including a first polyimide-polyamide acid and a second polyimide-polyamide acid. The first polyimide-polyamide acid is represented by formula (A),

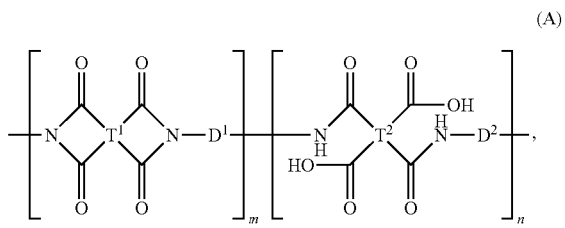

and the second polyimide-polyamide acid is represented by formula (B),

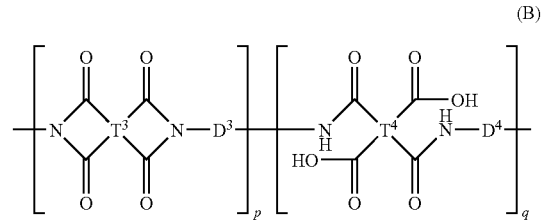

in which $T^1$, $T^2$, $T^3$ and $T^4$ are each independently a tetravalent residue of a tetracarboxylic acid dianhydride; $D^1$, $D^2$, $D^3$ and $D^4$ are each independently a divalent residue of a diamine; and m, n, p and q are each independently an positive integer, wherein $m/(m+n) \leq 0.5$ and $p/(p+q) \geq 0.5$.

In this invention, the first liquid crystal alignment solution includes two kinds of polyimide-polyamide acids with different imidization rates; thus, the liquid crystal alignment layer formed from the first liquid crystal alignment solution has the characteristics of stable pre-tilt angle, excellent orientation, high reliability, good rubbing property and less remaining image.

According to an embodiment of the present invention, the second polyimide-polyamide acid of the first liquid crystal alignment solution may be a polyimide-polyamide acid having a side chain on at least one of $D^3$ and $D^4$.

According to an embodiment of the present invention, the second polyimide-polyamide acid of the first liquid crystal alignment solution may further include that at least one of $D^3$ and $D^4$ is selected from the group consisting of formulae (1) to (9),

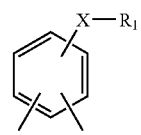

-continued

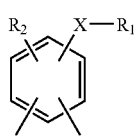
(2)

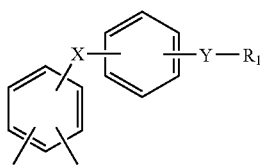
(3)

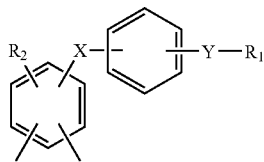
(4)

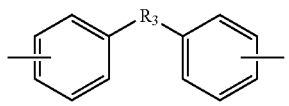
(5)

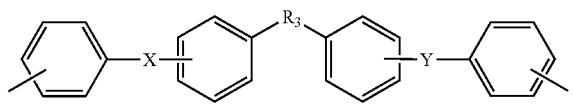
(6)

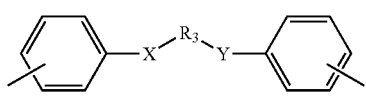
(7)

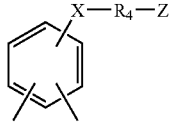
(8)

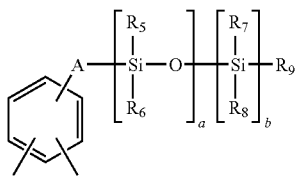
(9)

in which $R_1$ is a monovalent $C_{4\text{-}40}$ alicyclic group or a monovalent $C_{8\text{-}20}$ aliphatic group; $R_2$, $R_5$, $R_6$, $R_7$, $R_8$ and $R_9$ are each independently a halogen atom or a monovalent $C_{1\text{-}7}$ aliphatic group; $R_3$ is a divalent $C_{4\text{-}40}$ alicyclic group; $R_4$ is a divalent aromatic group, a divalent $C_{3\text{-}6}$ alicyclic group or a divalent $C_{1\text{-}8}$ aliphatic group; X and Y are each independently a divalent group selected from the group consisting of —O—, —NH—, —S—, —CO—, —COO—, —OCO—, —NHCO— and —CONH—; Z is a monovalent group selected from the group consisting of —$CF_3$, —CN, $COCH_3$, —COOH, —$NO_2$, $SOCH_3$, —$SO_2CH_3$, —$OCF_3$, —F and —Cl; A is a divalent organic group; and a and b are each independently an integer larger than or equal to 1.

According to an embodiment of the present invention, the weight ratio of the first polyimide-polyamide acid to the second polyimide-polyamide acid is, for example, between 5:95 and 95:5.

According to an embodiment of the present invention, the first liquid crystal alignment solution may further satisfy the inequality of $(m+p)/(m+n+p+q) \geqq 0.2$.

The present invention also provides a second liquid crystal alignment solution including a first polyimide-polyamide acid and a second polyimide-polyamide acid. The first polyimide-polyamide acid is represented by formula (A),

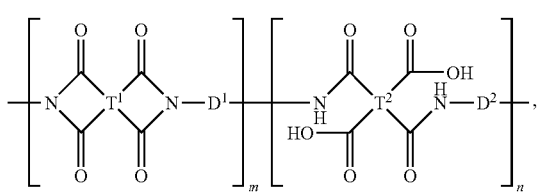
(A)

and the second polyimide-polyamide acid is represented by formula (B),

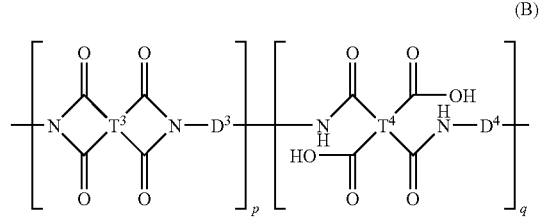
(B)

in which $T^1$, $T^2$, $T^3$ and $T^4$ are each independently a tetravalent residue of a tetracarboxylic acid dianhydride; m, n, p and q are each independently an positive integer; $D^1$ and $D^2$ are each independently a divalent residue of a diamine; and at least one of $D^3$ and $D^4$ is selected from the group consisting of formulae (1) to (9),

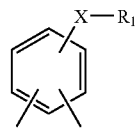
(1)

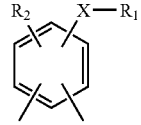
(2)

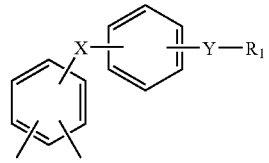
(3)

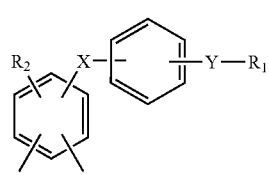
(4)

-continued

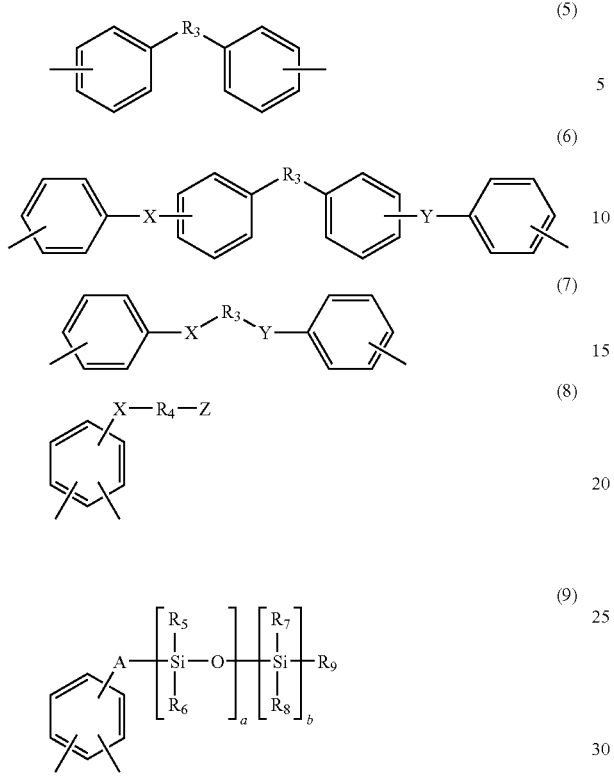

in which $R_1$ is a monovalent $C_{4-40}$ alicyclic group or a monovalent $C_{8-20}$ aliphatic group; $R_2$, $R_5$, $R_6$, $R_7$, $R_8$ and $R_9$ are each independently a halogen atom or a monovalent $C_{1-7}$ aliphatic group; $R_3$ is a divalent $C_{4-40}$ alicyclic group; $R_4$ is a divalent aromatic group, a divalent $C_{3-6}$ alicyclic group or a divalent $C_{1-8}$ aliphatic group; X and Y are each independently a divalent group selected from the group consisting of —O—, —NH—, —S—, —CO—, —COO—, —OCO—, —NHCO— and —CONH—; Z is a monovalent group selected from the group consisting of —CF$_3$, —CN, COCH$_3$, —COOH, —NO$_2$, SOCH$_3$, —SO$_2$CH$_3$, —OCF$_3$, —F and —Cl; A is a divalent organic group; and a and b are each independently an integer larger than or equal to 1.

In the second liquid crystal alignment solution according to the present invention, the pre-tilt angle of the liquid crystal can be adjusted to the appropriate angle by changing the side chain length of the polyimide-polyamide acid, and the change of the side chain length of the polyimide-polyamide acid can be made by changing the side chain length of the diamine compound.

In order to make the aforementioned and other objects, features and advantages of the present invention comprehensible, a preferred embodiment accompanied with formulae is described in detail below.

DESCRIPTION OF EMBODIMENTS

The present invention provides a first liquid crystal alignment solution including a first polyimide-polyamide acid and a second polyimide-polyamide acid. The first and second polyimide-polyamide acids have different imidization rates.

The first polyimide-polyamide acid is represented by formula (A),

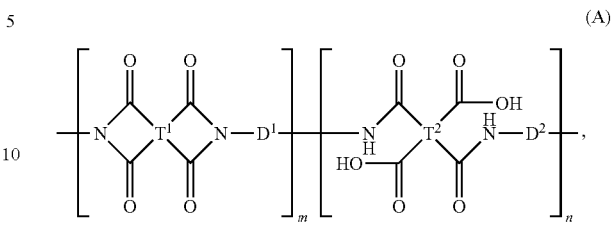

and the second polyimide-polyamide acid is represented by formula (B),

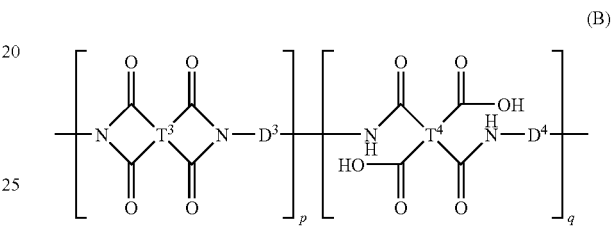

in which $T^1$, $T^2$, $T^3$ and $T^4$ are each independently a tetravalent residue of a tetracarboxylic acid dianhydride; $D^1$, $D^2$, $D^3$ and $D^4$ are each independently a divalent residue of a diamine; and m, n, p and q are each independently an positive integer, wherein $m/(m+n) \leq 0.5$ and $p/(p+q) \geq 0.5$. That is, the imidization rate of formula (A) is smaller than 50%, but the imidization rate of formula (B) is larger than 50%.

The weight ratio of the first polyimide-polyamide acid to the second polyimide-polyamide acid is, for example, between 5:95 and 95:5.

The imidization rate of the liquid crystal alignment solution can be 20% or higher, i.e. $(m+p)/(m+n+p+q) \geq 0.2$, for improving the electric characteristics of the alignment layer.

Furthermore, the second polyimide-polyamide acid presented by formula (B) of the first liquid crystal alignment solution is a polyimide-polyamide acid having a side chain on at least one of $D^3$ and $D^4$. That is, at least one of $D^3$ and $D^4$ is selected from the group consisting of formulae (1) to (9),

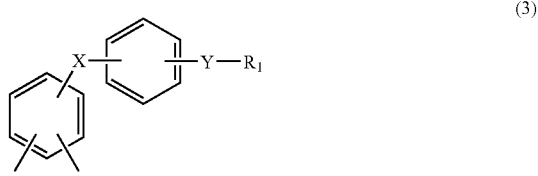

-continued

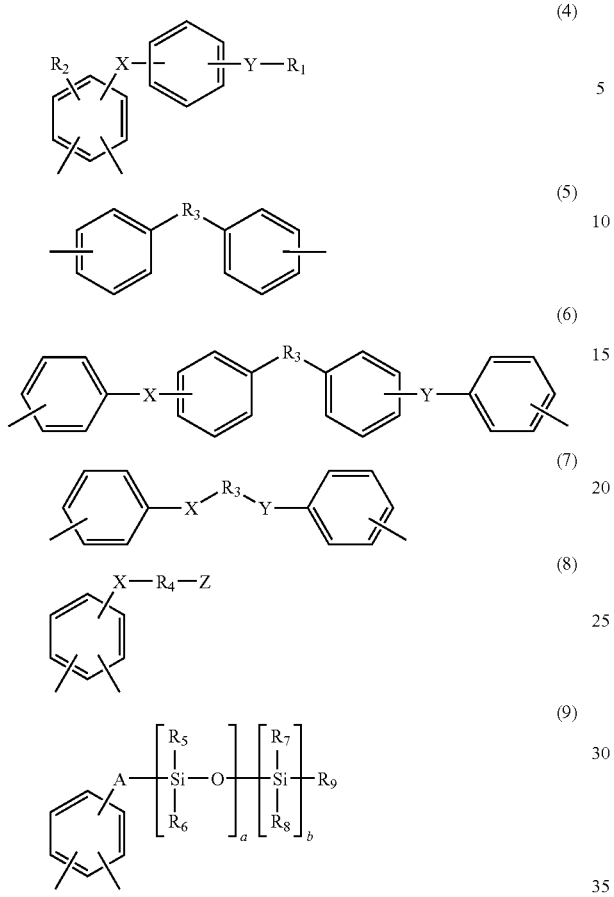

in which $R_1$ is a monovalent $C_{4-40}$ alicyclic group or a monovalent $C_{8-20}$ aliphatic group; $R_2$, $R_5$, $R_6$, $R_7$, $R_8$ and $R_9$ are each independently a halogen atom or a monovalent $C_{1-7}$ aliphatic group; $R_3$ is a divalent $C_{4-40}$ alicyclic group; $R_4$ is a divalent aromatic group, a divalent $C_{3-6}$ alicyclic group or a divalent $C_{1-8}$ aliphatic group; X and Y are each independently a divalent group selected from the group consisting of —O—, —NH—, —S—, —CO—, —COO—, —OCO—, —NHCO— and —CONH—; Z is a monovalent group selected from the group consisting of —CF$_3$, —CN, COCH$_3$, —COOH, —NO$_2$, SOCH$_3$, —SO$_2$CH$_3$, —OCF$_3$, —F and —Cl; A is a divalent organic group; and a and b are each independently an integer larger than or equal to 1.

The present invention also provides a second liquid crystal alignment solution including a first polyimide-polyamide acid and a second polyimide-polyamide acid. The first polyimide-polyamide acid is represented by formula (A),

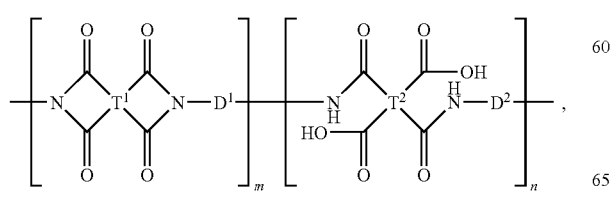

and the second polyimide-polyamide acid is represented by formula (B),

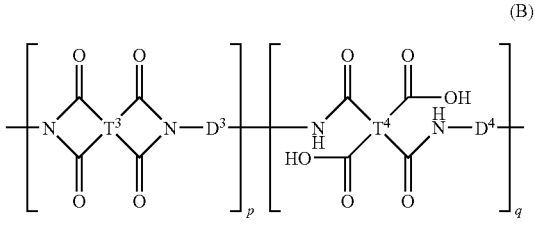

in which $T^1$, $T^2$, $T^3$ and $T^4$ are each independently a tetravalent residue of a tetracarboxylic acid dianhydride; m, n, p and q are each independently an positive integer; $D^1$ and $D^2$ are each independently a divalent residue of a diamine; and at least one of $D^3$ and $D^4$ are selected from the group consisting of formulae (1) to (9),

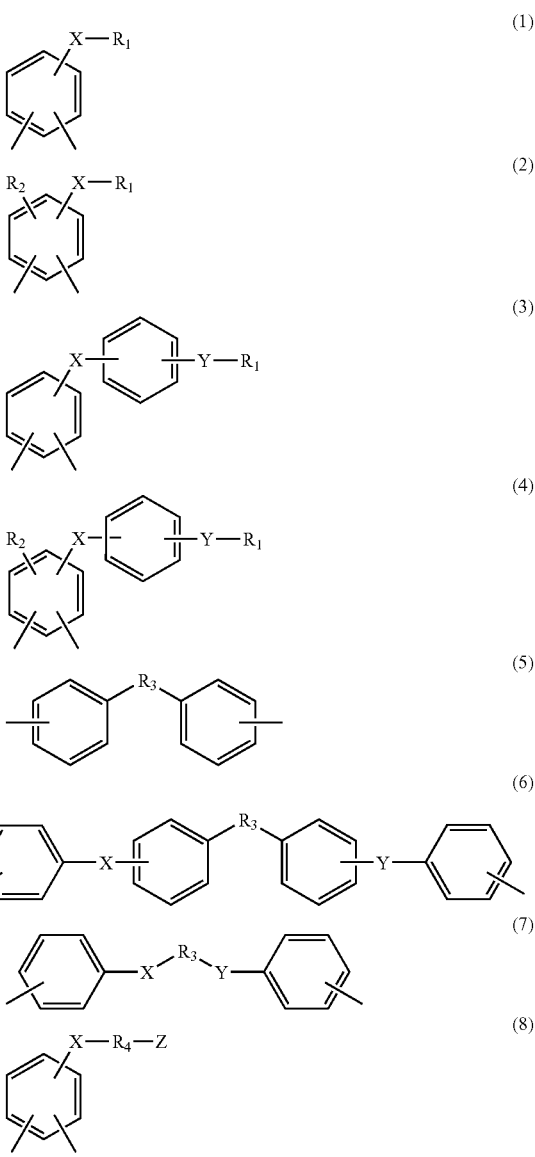

-continued

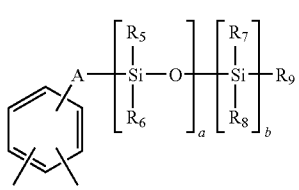

(9)

in which $R_1$ is a monovalent $C_{4-40}$ alicyclic group or a monovalent $C_{8-20}$ aliphatic group; $R_2$, $R_5$, $R_6$, $R_7$, $R_8$ and $R_9$ are each independently a halogen atom or a monovalent $C_{1-7}$ aliphatic group; $R_3$ is a divalent $C_{4-40}$ alicyclic group; $R_4$ is a divalent aromatic group, a divalent $C_{3-6}$ alicyclic group or a divalent $C_{1-8}$ aliphatic group; X and Y are each independently a divalent group selected from the group consisting of —O—, —NH—, —S—, —CO—, —COO—, —OCO—, —NHCO— and —CONH—; Z is a monovalent group selected from the group consisting of —$CF_3$, —CN, $COCH_3$, —COOH, —$NO_2$, $SOCH_3$, —$SO_2CH_3$, —$OCF_3$, —F and —Cl; A is a divalent organic group; and a and b are each independently an integer larger than or equal to 1.

In the first and second liquid crystal alignment solutions according to the present invention, the method of forming the polyimide-polyamide acids presented by formulae (A) and (B) includes a polymerization reaction of a tetracarboxylic acid dianhydride and a diamine compound in an organic solvent, and a partial ring-closing reaction carried out by a dehydration reaction, so that a polyimide-polyamide acid is obtained.

Therefore, in order to make a stable pre-tilt angle and uniform orientation for a liquid crystal display device, in the first and second liquid crystal alignment solutions according to the present invention, the ratio of the diamide compound having the structure of formulae (1) to (9) in formula (B) ranges from 0.1 to 50 mole %, preferably from 0.1 to 20 mole %, and more preferably from 0.5 to 10 mole %, for example.

Examples of the tetracarboxylic acid dianhydride as described above are shown in Table 1 (No. 1-1 to No. 1-56). Examples of the diamine compound as described above are shown in Table 2 (No. 2-1 to No. 2-86) and Table 3 (No. 3-1 to No. 3-109), wherein the diamine compounds in Table 2 are diamine compounds with a side chain while the diamine compounds in Table 3 are diamine compounds without a side chain.

TABLE 1

| NO. | Tetracarboxylic acid dianhydride |
|---|---|
| 1-1 | |
| 1-2 | |
| 1-3 | |
| 1-4 | |
| 1-5 | |

TABLE 1-continued
| NO. | Tetracarboxylic acid dianhydride |
|---|---|
| 1-6 | 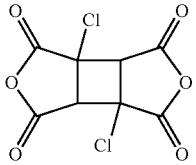 |
| 1-7 | 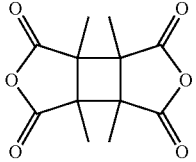 |
| 1-8 | 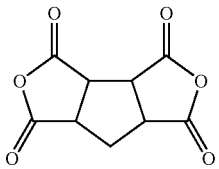 |
| 1-9 | 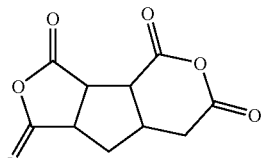 |
| 1-10 | 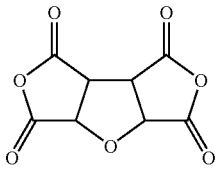 |
| 1-11 | 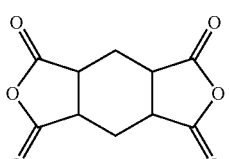 |
| 1-12 | 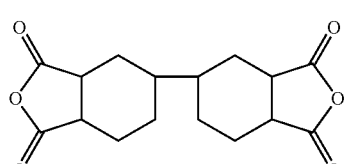 |
| 1-13 | 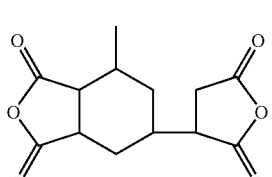 |

TABLE 1-continued
| NO. | Tetracarboxylic acid dianhydride |
|---|---|
| 1-14 | 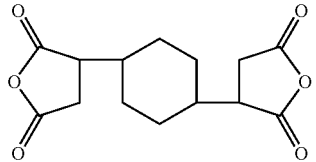 |
| 1-15 | 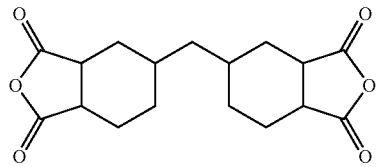 |
| 1-16 | 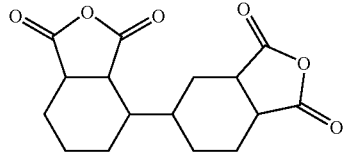 |
| 1-17 | 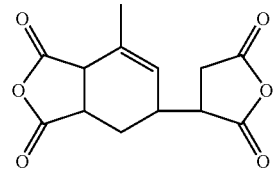 |
| 1-18 | 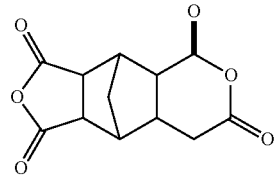 |
| 1-19 | 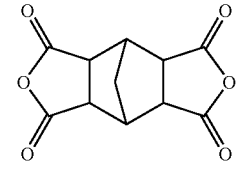 |
| 1-20 | 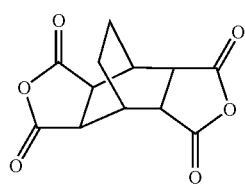 |
| 1-21 | 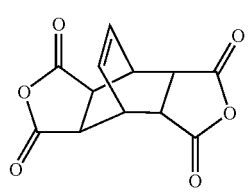 |

TABLE 1-continued

| NO. | Tetracarboxylic acid dianhydride |
|---|---|
| 1-22 | |
| 1-23 | |
| 1-24 | |
| 1-25 | |
| 1-26 | |
| 1-27 | |
| 1-28 | |

TABLE 1-continued
| NO. | Tetracarboxylic acid dianhydride |
|---|---|
| 1-29 | 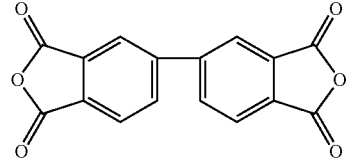 |
| 1-30 | 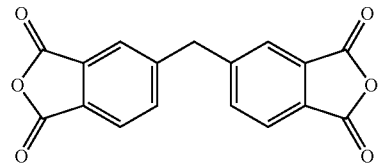 |
| 1-31 | 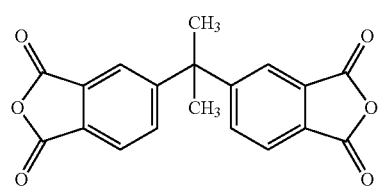 |
| 1-32 | 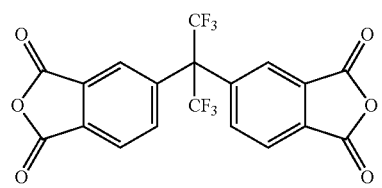 |
| 1-33 | 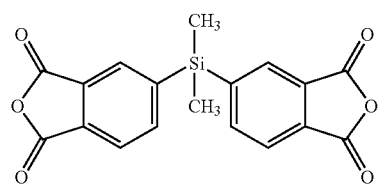 |
| 1-34 | 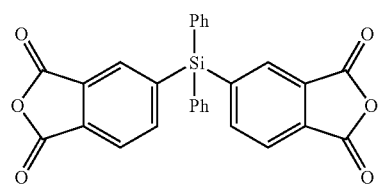 |
| 1-35 | 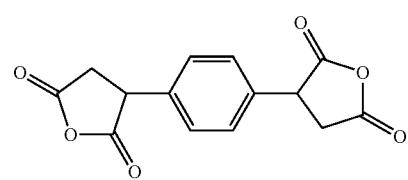 |
| 1-36 | 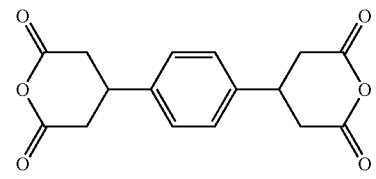 |

TABLE 1-continued

| NO. | Tetracarboxylic acid dianhydride |
|---|---|
| 1-37 | |
| 1-38 | |
| 1-39 | |
| 1-40 | |
| 1-41 | |
| 1-42 | |
| 1-43 | |

TABLE 1-continued

| NO. | Tetracarboxylic acid dianhydride |
|---|---|
| 1-44 | |
| 1-45 | |
| 1-46 | |
| 1-47 | |
| 1-48 | |
| 1-49 | |
| 1-50 | |
| 1-51 | |

TABLE 1-continued

| NO. | Tetracarboxylic acid dianhydride |
|---|---|
| 1-52 | |
| 1-53 | |
| 1-54 | |
| 1-55 | |
| 1-56 | |

TABLE 2

| NO. | Diamine compound |
|---|---|
| 2-1 | H₂N–(Ar)–O–(Ar)–OC₁₂H₂₅ with H₂N |
| 2-2 | H₂N–(Ar)–O–(Ar)–OC₁₅H₃₃ with H₂N |

TABLE 2-continued

| NO. | Diamine compound |
|---|---|
| 2-3 | 2,4-diamino-phenyl 4-pentadecyloxyphenyl ether (H$_2$N, H$_2$N substituents; –OC$_{15}$H$_{37}$) |
| 2-4 | 4-dodecyloxyphenyl 2,4-diaminobenzoate (–OC$_{12}$H$_{25}$) |
| 2-5 | 4-pentadecyloxyphenyl 2,4-diaminobenzoate (–OC$_{15}$H$_{33}$) |
| 2-6 | 4-pentadecyloxyphenyl 2,4-diaminobenzoate (–OC$_{15}$H$_{37}$) |
| 2-7 | 3,5-diaminophenyl 4-dodecyloxyphenyl ether (–OC$_{12}$H$_{25}$) |
| 2-8 | 3,5-diaminophenyl 4-pentadecyloxyphenyl ether (–OC$_{15}$H$_{33}$) |
| 2-9 | 3,5-diaminophenyl 4-pentadecyloxyphenyl ether (–OC$_{15}$H$_{37}$) |
| 2-10 | 4-dodecyloxyphenyl 3,5-diaminobenzoate (–OC$_{12}$H$_{25}$) |

TABLE 2-continued
| NO. | Diamine compound |
|---|---|
| 2-11 | 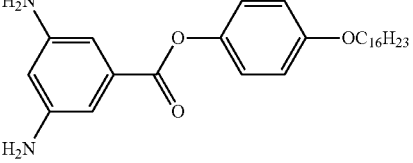 |
| 2-12 | 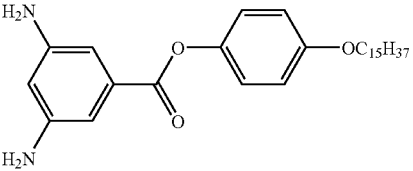 |
| 2-13 | 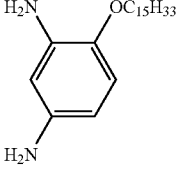 |
| 2-14 | 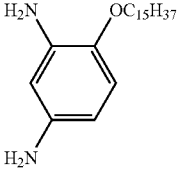 |
| 2-15 | 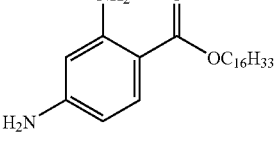 |
| 2-16 | 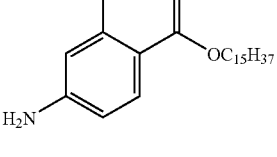 |
| 2-17 | 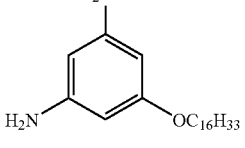 |
| 2-18 | 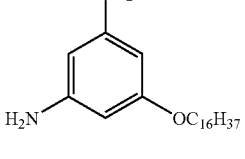 |
| 2-19 | 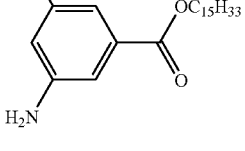 |

TABLE 2-continued
| NO. | Diamine compound |
|---|---|
| 2-20 | 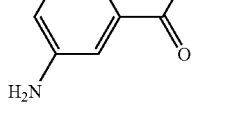 |
| 2-21 | 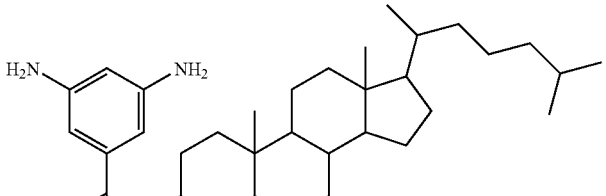 |
| 2-22 | 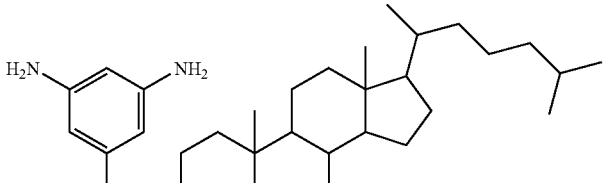 |
| 2-23 | 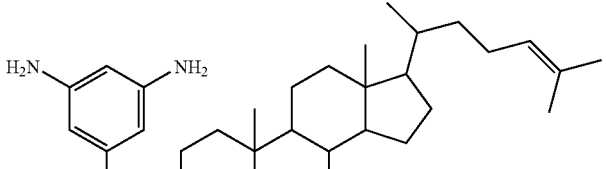 |
| 2-24 | 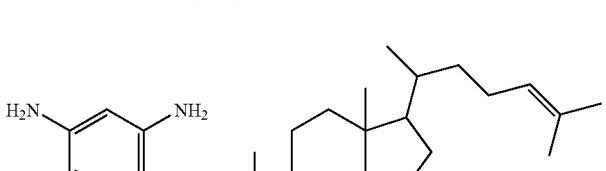 |
| 2-25 | 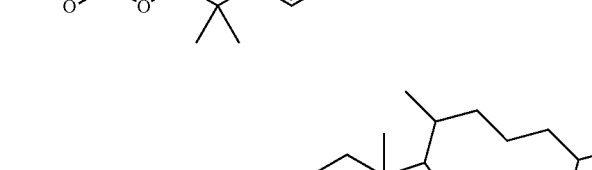 |

TABLE 2-continued
| NO. | Diamine compound |
|---|---|
| 2-26 | 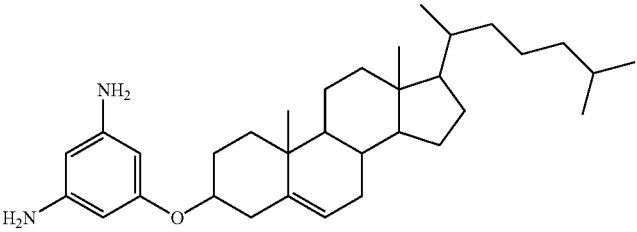 |
| 2-27 | 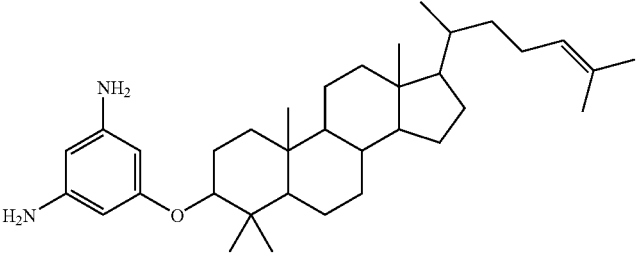 |
| 2-28 | 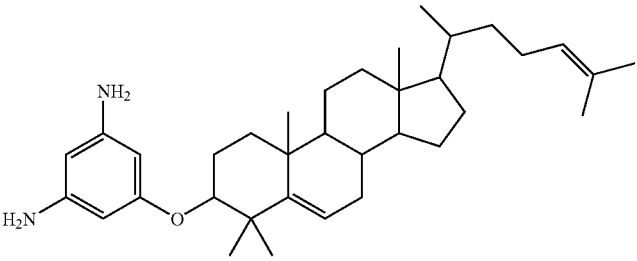 |
| 2-29 | 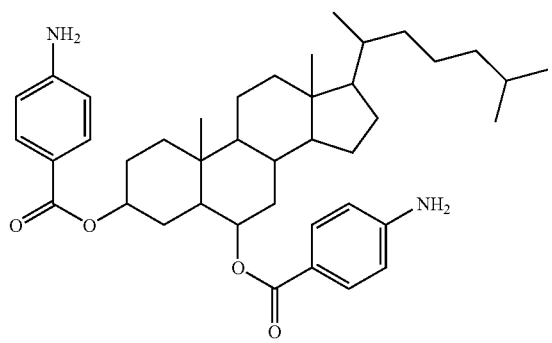 |
| 2-30 | 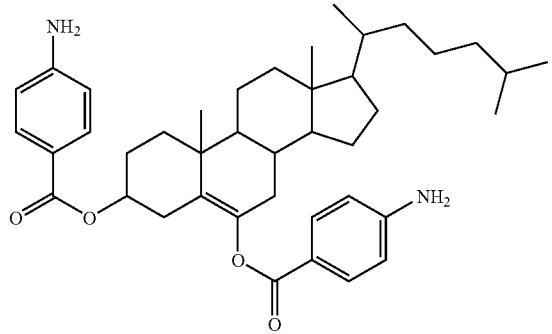 |

TABLE 2-continued

| NO. | Diamine compound |
|---|---|
| 2-31 | |
| 2-32 | |
| 2-33 | |
| 2-34 | |

TABLE 2-continued

| NO. | Diamine compound |
|---|---|
| 2-35 | |
| 2-36 | |
| 2-37 | |
| 2-38 | |
| 2-39 | |

TABLE 2-continued

| NO. | Diamine compound |
|---|---|
| 2-40 | |
| 2-41 | |
| 2-42 | |
| 2-43 | |
| 2-44 | |
| 2-45 | |
| 2-46 | |

TABLE 2-continued

| NO. | Diamine compound |
|---|---|
| 2-47 | |
| 2-48 | |
| 2-49 | |
| 2-50 | |
| 2-51 | |

TABLE 2-continued

| NO. | Diamine compound |
|---|---|
| 2-52 | |
| 2-53 | |
| 2-54 | |
| 2-55 | |
| 2-56 | |

TABLE 2-continued

| NO. | Diamine compound |
|---|---|
| 2-57 | |
| 2-58 | |
| 2-59 | |
| 2-60 | |
| 2-61 | |

TABLE 2-continued

| NO. | Diamine compound |
|---|---|
| 2-62 | 4,4'-bis(4-aminobenzyl)-substituted compound bearing a 4-C$_2$H$_9$-cyclohexyl group at the central quaternary carbon |
| 2-63 | 4,4'-bis(4-aminobenzyl)-substituted compound bearing a 4-C$_7$H$_{15}$-cyclohexyl group at the central quaternary carbon |
| 2-64 | 4,4'-bis[2-(4-aminophenyl)ethyl]-substituted compound bearing a 4-C$_5$H$_{11}$-bicyclohexyl group at the central quaternary carbon |
| 2-65 | 3,5-diaminobenzyl-(4-cyclohexylphenyl) compound |
| 2-66 | 3,5-diaminobenzyl-[4-(4-C$_5$H$_{11}$-cyclohexyl)phenyl] compound |
| 2-67 | 3,5-diaminobenzyl-[4-(4'-C$_5$H$_{11}$-bicyclohexyl)phenyl] compound |
| 2-68 | 3,5-diaminobenzyl-[4-(4-C$_5$H$_{11}$-cyclohexyl)phenyl] compound |

TABLE 2-continued

| NO. | Diamine compound |
|---|---|
| 2-69 | 2-amino-4-aminobenzyl-(4-pentylcyclohexyl)benzene structure with NH₂, H₂N groups and C₅H₁₁ |
| 2-70 | Similar structure with bicyclohexyl and C₅H₁₁ |
| 2-71 | 3,5-diaminobenzoic acid 4-pentylcyclohexyl ester |
| 2-72 | 3,5-diamino-N-(4-pentylcyclohexyl)benzamide |
| 2-73 | 3,5-diamino-(4-pentylcyclohexyl)phenoxybenzene |
| 2-74 | Bis(4-aminophenoxy) structure with OC₁₆H₃₃ ester |
| 2-75 | Bis(4-aminobenzamido) structure with OC₁₆H₃₃ ester |
| 2-76 | 3,5-diamino-(4'-fluorobiphenyloxy)benzene |

TABLE 2-continued

| NO. | Diamine compound |
|---|---|
| 2-77 | 3,5-diamino-phenyl 4'-(trifluoromethoxy)biphenyl-4-yl ether |
| 2-78 | 2,4-diamino-phenyl 4'-(trifluoromethoxy)biphenyl-4-yl ether |
| 2-79 | 2,4-diamino-phenyl 4'-cyanobiphenyl-4-yl ether |
| 2-80 | 4-[(4-trifluoromethylbenzoyl)oxy]cyclohexyl 3,5-diaminobenzoate |
| 2-81 | 4-[(4-fluorobenzoyl)oxy]cyclohexyl 3,5-diaminobenzoate |
| 2-82 | 1-[3-(biphenyl-4-yloxy)propoxy]-3,5-diaminobenzene |
| 2-83 | 1-{3-[(4'-cyanobiphenyl-4-yl)oxy]propoxy}-3,5-diaminobenzene |
| 2-84 | 1-{3-[(4'-fluorobiphenyl-4-yl)oxy]propoxy}-3,5-diaminobenzene |

TABLE 2-continued

| NO. | Diamine compound |
|---|---|
| 2-85 | 3,5-diamino-phenyl-O-(CH2)3-O-C6H4-C6H4-OCF3 |
| 2-86 | 3,5-diaminobenzoic acid ester of 4-(4'-pentylcyclohexyl)cyclohexanol |

TABLE 3

| NO. | Diamine compound |
|---|---|
| 3-1 | H2N-(CH2)3-NH2 |
| 3-2 | H2N-(CH2)4-NH2 |
| 3-3 | H2N-(CH2)5-NH2 |
| 3-4 | H2N-(CH2)6-NH2 |
| 3-5 | H2N-(CH2)7-NH2 |
| 3-6 | H2N-(CH2)8-NH2 |
| 3-7 | H2N-(CH2)9-NH2 |
| 3-8 | H2N-(CH2)10-NH2 |
| 3-9 | H2N-(CH2)11-NH2 |
| 3-10 | H2N-(CH2)12-NH2 |
| 3-11 | 1,3-bis(aminomethyl)cyclohexane |
| 3-12 | 1,4-bis(aminomethyl)cyclohexane |
| 3-13 | 1,4-diaminocyclohexane |
| 3-14 | 4,4'-methylenebis(cyclohexylamine) |

TABLE 3-continued
| NO. | Diamine compound |
|---|---|
| 3-15 |  |
| 3-16 | 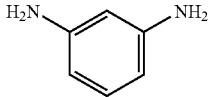 |
| 3-17 | 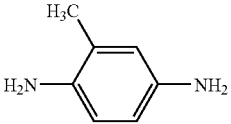 |
| 3-18 | 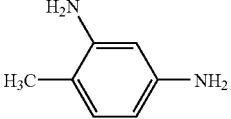 |
| 3-19 | 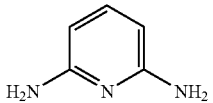 |
| 3-20 | 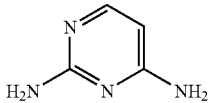 |
| 3-21 | 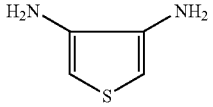 |
| 3-22 | 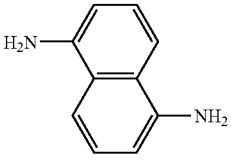 |
| 3-23 | 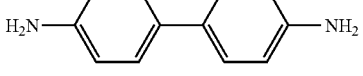 |
| 3-24 | 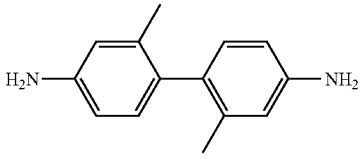 |
| 3-25 | 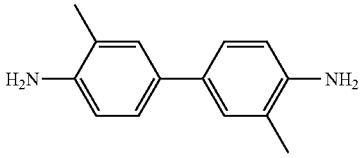 |
| 3-26 | 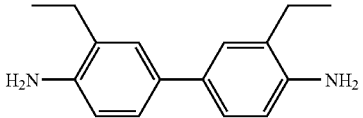 |

TABLE 3-continued

| NO. | Diamine compound |
|---|---|
| 3-27 | 3,3'-bis(trifluoromethyl)-4,4'-biphenyldiamine (H$_2$N–C$_6$H$_3$(CF$_3$)–C$_6$H$_3$(CF$_3$)–NH$_2$) |
| 3-28 | 2,2'-bis(trifluoromethyl)-4,4'-biphenyldiamine |
| 3-29 | 2,2'-disulfo-4,4'-biphenyldiamine |
| 3-30 | 3,3'-dimethoxy-4,4'-biphenyldiamine |
| 3-31 | 3,3'-dichloro-4,4'-biphenyldiamine |
| 3-32 | 3,3'-dihydroxy-4,4'-biphenyldiamine |
| 3-33 | 2,2',5,5'-tetrachloro-4,4'-biphenyldiamine |
| 3-34 | 2,2'-dichloro-5,5'-dimethoxy-4,4'-biphenyldiamine |
| 3-35 | octafluoro-4,4'-biphenyldiamine |

TABLE 3-continued

| NO. | Diamine compound |
|---|---|
| 3-36 | 5-methyl-2-sulfo-4-amino-biphenyl with mirror substituents (H₃C, HO₂S, H₂N, NH₂, SO₂H, CH₃) |
| 3-37 | 4,4'-methylenedianiline (H₂N–C₆H₄–CH₂–C₆H₄–NH₂) |
| 3-38 | 4,4'-(propane-2,2-diyl)dianiline |
| 3-39 | 4,4'-(hexafluoroisopropylidene)dianiline |
| 3-40 | 4,4'-methylenebis(2-chloroaniline) |
| 3-41 | bis(4-amino-2-methylphenyl)methane |
| 3-42 | 4,4'-methylenebis(2-methylaniline) |
| 3-43 | 5,5'-methylenebis(2-aminobenzoic acid) |
| 3-44 | 1,1-bis(4-aminophenyl)cyclohexane |

TABLE 3-continued

| NO. | Diamine compound |
|---|---|
| 3-45 | 3,3',5,5'-tetramethyl-4,4'-methylenedianiline |
| 3-46 | 2,2',3,3'-tetrachloro-4,4'-methylenedianiline |
| 3-47 | 3,3'-methylenedianiline |
| 3-48 | 2,2-bis(3-aminophenyl)hexafluoropropane |
| 3-49 | 2,2-bis(3-amino-4-methylphenyl)hexafluoropropane |
| 3-50 | 2,2-bis(3-amino-4-hydroxyphenyl)hexafluoropropane |
| 3-51 | 4,4'-oxydianiline |
| 3-52 | 3,4'-oxydianiline |
| 3-53 | 4,4'-thiodianiline |
| 3-54 | 4,4'-sulfinyldianiline |
| 3-55 | 4,4'-diaminobenzophenone |

TABLE 3-continued

| NO. | Diamine compound |
|---|---|
| 3-56 | 3,3'-diaminobenzophenone (H₂N–C₆H₄–C(=O)–C₆H₄–NH₂) |
| 3-57 | 4,4'-diaminodiphenyl sulfone (H₂N–C₆H₄–SO₂–C₆H₄–NH₂) |
| 3-58 | 3,3'-diaminodiphenyl sulfone (H₂N–C₆H₄–SO₂–C₆H₄–NH₂) |
| 3-59 | bis(3-amino-4-hydroxyphenyl) sulfone |
| 3-60 | bis(3-amino-4-fluorophenyl) sulfone |
| 3-61 | 1,2-bis(4-aminophenyl)ethane |
| 3-62 | 1,2-bis(4-amino-3-methylphenyl)ethane |
| 3-63 | 1,2-bis(4-amino-2-methylphenyl)ethane |
| 3-64 | 4,4'-diaminostilbene |
| 3-65 | 6,6'-diamino-2,2'-bipyridine |
| 3-66 | 2,7-diaminophenanthrene |

TABLE 3-continued

| NO. | Diamine compound |
|---|---|
| 3-67 | 9,10-dimethyl-2,7-diaminophenanthrene |
| 3-68 | 2,7-diaminophenanthrene |
| 3-69 | 1,5-diaminoanthracene |
| 3-70 | 9,10-dimethyl-1,5-diaminoanthracene |
| 3-71 | 2,7-diaminofluorene |
| 3-72 | 3,7-diamino-2,8-dimethyldibenzothiophene-5,5-dioxide |
| 3-73 | 2,6-diaminoanthraquinone |
| 3-74 | 1,5-diaminoanthraquinone |

TABLE 3-continued

| NO. | Diamine compound |
|---|---|
| 3-75 | 9,10-dimethyl-2,7-diaminophenanthrene |
| 3-76 | 2,7-diaminophenanthrene |
| 3-77 | 1,5-diaminoanthracene |
| 3-78 | 9,10-dimethyl-1,5-diaminoanthracene |
| 3-79 | 2,7-diaminofluorene |
| 3-80 | 3,7-diamino-2,8-dimethyldibenzothiophene-5,5-dioxide |
| 3-81 | 2,6-diaminoanthraquinone |
| 3-82 | 1,5-diaminoanthraquinone |

TABLE 3-continued

| NO. | Diamine compound |
|---|---|
| 3-83 | 9,9-bis(4-aminophenyl)fluorene |
| 3-84 | 9,9-bis(4-amino-3-methylphenyl)fluorene |
| 3-85 | 9,9-bis(3-amino-4-hydroxyphenyl)fluorene |
| 3-86 | 9,9-bis(4-amino-3-fluorophenyl)fluorene |
| 3-87 | 1,3-diaminopyrene |
| 3-88 | 1,6-diaminopyrene |
| 3-89 | 1,7-diaminopyrene |

TABLE 3-continued

| NO. | Diamine compound |
|---|---|
| 3-90 | 4,4'-bi(3-methyl-1-naphthylamine) structure (two methyl-substituted aminonaphthalenes connected) |
| 3-91 | bis(2-amino-6-methylpyrimidin-4-yl) disulfide |
| 3-92 | 2,5-bis(4-aminophenyl)-1,3,4-oxadiazole |
| 3-93 | 1,6-diaminopyrene |
| 3-94 | 4,4'-bi(3-methyl-1-naphthylamine) isomer |
| 3-95 | bis(2-amino-6-methylpyrimidin-4-yl) disulfide |
| 3-96 | 2,5-bis(4-aminophenyl)-1,3,4-oxadiazole |
| 3-97 | 4-amino-N-(4-aminophenyl)benzamide |

TABLE 3-continued

| NO. | Diamine compound |
|---|---|
| 3-98 | 3,3'-[1,3-phenylenebis(oxy)]dianiline |
| 3-99 | 4,4'-[1,4-phenylenebis(oxy)]dianiline |
| 3-100 | 4,4'-[1,3-phenylenebis(oxy)]dianiline |
| 3-101 | 4,4'-(1,4-phenylenediisopropylidene)dianiline |
| 3-102 | 4,4'-[(2,2-dimethyl-1,3-propanediyl)bis(oxy)]dianiline |
| 3-103 | 4,4'-[1,5-pentanediylbis(oxy)]dianiline |
| 3-104 | 4,4'-[(1,1'-biphenyl-4,4'-diyl)bis(oxy)]dianiline |
| 3-105 | 4,4'-[isopropylidenebis(4,1-phenyleneoxy)]dianiline |
| 3-106 | 4,4'-[hexafluoroisopropylidenebis(4,1-phenyleneoxy)]dianiline |
| 3-107 | 4,4'-[cyclohexylidenebis(4,1-phenyleneoxy)]dianiline |
| 3-108 | 4,4'-[sulfonylbis(4,1-phenyleneoxy)]dianiline |
| 3-109 | 3,3'-[sulfonylbis(4,1-phenyleneoxy)]dianiline |

Furthermore, the compounds in Tables 1, 2 and 3 can be isomeric compounds or mixtures thereof. The tetracarboxylic acid dianhydrides and the diamine compounds as described above are intended to illustrate but not to limit the present invention. Therefore, the tetracarboxylic acid dianhydrides and the diamine compounds can be the compounds which are not mentioned herein.

Specially, in order to make a high voltage holding ratio (VHR) for a liquid crystal display device, at least one compound having an alicyclic structure is selected from a group consisting of NO. 1-2, 1-3, 1-4, 1-5, 1-6, 1-7, 1-8, 1-9, 1-11, 1-12, 1-13, 1-14, 1-15, 1-16, 1-18, 1-19, 1-20, 1-22, 1-23, 1-24, 1-45, 1-47 and 1-49. Also, the above-mentioned compounds including NO. 1-25, 1-27, 1-28, 1-29, 1-30, 1-40, 1-41, 1-44, 1-46, 1-48, 1-50, 1-51, 1-52, 1-53, 1-54 and 1-55 may constitute with other suitable compounds properly to reduce the remaining image phenomenon.

The pre-tilt angle of liquid crystal molecules can be adjusted by changing the side chain length of the polyimide-polyamide acid. For example, the change of the side chain length of the polyimide-polyamide acid can be made by changing the side chain length of the diamine compound. The appropriate pre-tilt angle can be provided by selecting at least one of the diamine compounds shown in No. 2-1 to No. 2-86.

The synthesis method of a polyimide-polyamide acid is described in the following.

The ratio of a tetracarboxylic acid dianhydride to a diamine compound for synthesizing a polyimide-polyamide acid is described below. When an anhydride group of the tetracarboxylic acid dianhydride is 1 equivalent, an amino group of the diamine compound is preferably 0.5-2 equivalents and more preferably 0.7-1.5 equivalents.

The synthesis reaction of the polyimide-polyamide acid is carried out in an organic solvent. The dissolubility of the polyimide-polyamide acid is better in some of the organic solvents than the others of the organic solvents. Examples of the organic solvents having better dissolubility to the polyimide-polyamide acid include N-methyl-2-pyrrolidone, N,N-dimethylformamide, N,N-dimethyl acetamide, N-methylcaprolactam, dimethyl sulfoxide, tetramethyl urea, hexamethyl phosphoramide, γ-butyrolactone and pyridine, and two or more of the above-mentioned solvents can be mixed when used.

The organic solvents having worse dissolubility to the polyimide-polyamide acid can be mixed with the above-mentioned organic solvents as long as the polyimide-polyamide acid is not precipitated from the mixed organic solvents. Examples of the organic solvents having worse dissolubility to the polyimide-polyamide acid include methanol, ethanol, isopropyl alcohol, 1-butanol, cyclohexanol, ethylene glycol, ethylene glycol methyl ether, ethylene glycol monoethyl ether, ethylene glycol monobutyl ether, ethylene glycol dimethyl ether, ethylene glycol diethyl ether, diethyl ether, acetone, methyl ethyl ketone, cyclohexanone, methyl acetate, ethyl acetate, tetrahydrofuran, dichloromethane, trichloromethane, 1,2-dichloroethane, benzene, methylbenzene, dimethylbenzene, n-hexane, n-heptane and 1-octane.

A dehydration ring-closing reaction is required to form the polyimide-polyamide acid. The dehydration ring-closing reaction can be performed by directly heating or adding a dehydration agent and a catalyst.

(1) Directly Heating:

The reaction temperature is between 50 and 300 degrees centigrade and preferably between 100 and 250 degrees centigrade, for example.

(2) Adding a Dehydration Agent and a Catalyst:

The reaction temperature is between −20 and 150 degrees centigrade and preferably between 0 and 120 degrees centigrade, for example. The dehydration agent is an anhydride such as acetic anhydride, propionic anhydride or trifluoroacetic anhydride, for example. 0.01-20 moles of the dehydration agent are preferably used for every mole of repeating unit of the polyimide-polyamide acid. The catalyst is a tertiary amine such as triethylamine, pyridine or dimethylpiridine, for example. 0.01-10 moles of the catalyst are preferably used for every mole of the dehydration agent.

The purification method of the polyimide-polyamide acid includes pouring a lot of solvent having worse dissolubility into the reaction solvent of the polyimide-polyamide acid, so as to obtain a precipitation, and then performing a drying process under reduced pressure to obtain the crude polyimide-polyamide acid. Thereafter, the crude polyimide-polyamide acid is dissolved in an organic solvent and then precipitated by using another solvent having worse dissolubility. The above process steps can be performed once or multiple times so as to purify the polyimide-polyamide acid. Then, the polyimide-polyamide acid is dissolved in a solvent having better dissolubility.

The viscosity $\eta_{in}$ of the liquid crystal alignment solution can be obtained from formula (I):

$$\eta_{in} = \frac{\ln(\text{Flow time of solution/Flow time of solvent})}{\text{Weight concentration of polymer}} \quad (I)$$

In the present invention, the solids content of the liquid crystal alignment solution is preferably between 1 and 10 wt % in terms of the viscosity and volatility.

The liquid crystal alignment solution in accordance with the present invention is coated on a substrate to form a liquid crystal alignment layer. When the solids content of the liquid crystal alignment solution is below 1 wt %, the thickness of the liquid crystal alignment layer is too thin so that the orientation of liquid crystal molecules is affected; when the solids content of the liquid crystal alignment solution is more than 10 wt %, the coating quality is deteriorated.

In addition, the fabrication temperature of the liquid crystal alignment solution is preferably between 0 and 150 degrees centigrade and more preferably between 25 and 50 degrees centigrade.

In this invention, examples of the organic solvent of the liquid crystal alignment solution include N-methyl-2-pyrrolidone, N,N-dimethylformamide, N,N-dimethyl acetamide, N-Methylcaprolactam, dimethyl sulfoxide, γ-butyrolactone, γ-butyrolactam, ethylene glycol monomethyl ether, ethylene glycol monoethyl ether, ethylene glycol n-propyl ether and ethylene glycol monobutyl ether, and two or more of the above-mentioned solvents can be mixed when used.

The liquid crystal alignment solution in accordance with the present invention may further include an organic siloxane compound such as aminopropyl-trimethoxy-silane, aminopropyl-triethoxy-silane, vinyl-methyl-silane, N-(2-aminoethyl)-3-aminopropyl-methyl-dimethoxy-silane, N-(2-aminoethyl)-3-aminopropyl-trimethoxy-silane, vinyl-triethoxy-silane, 3-methacryloxy-propyl-trimethoxy-silane, 3-epoxypropoxy-propyl-trimethoxy-silane, 3-epoxypropoxy-propyl-methyl-dimethoxy-silane, 2-(3,4-epoxycyclohexyl)-ethyl-trimethoxy-silane, 3-ureido-propyl-trimethoxy-silane, 3-ureido-propyl-triethoxy-silane, N-ethoxycarbonyl-3-aminopropyl-trimethoxysilane, N-ethoxycarbonyl-3-aminopropyl-triethoxysilane, N-triethoxysilylpropyl-triethylene-triamine, N-trimethoxysilylpropyl-triethylene-Triamine, N-bis(oxyethylene)-3-aminopropyl-trimethoxy-silane, N-bis(oxyethylene)-3-aminopropyl-triethyl-silane.

The above-mentioned organic siloxane compounds can improve the adhesion between the liquid crystal alignment layer and the substrate under the condition that the amount of the organic siloxane compound does not impact the required characteristics of the liquid crystal alignment layer. If the amount of organic siloxane compound in the liquid crystal alignment solution is too much, the orientation performance of the liquid crystal alignment layer is reduced; if the amount of the organic siloxane compound in the liquid crystal alignment solution is not enough, the rubbing mura and particles occur in the liquid crystal alignment layer. Therefore, the concentration of the organic siloxane compound in the liquid crystal alignment solution with respect to the polymer weight of the liquid crystal alignment solution is preferably between 0.01 and 5 wt % and more preferably between 0.1 and 3 wt %.

Furthermore, the liquid crystal alignment solution in accordance with the present invention may also include an epoxy compound such as ethylene glycol diglycidyl ether, propylene glycol diglycidyl ether, tripropylene glycol diglycidyl ether, neopentyl glycol diglycidyl ether, 1,6-hexanediol diglycidyl ether, glycerine diglycidyl ether, glycerol diglycidyl ether, 2,2-dibromoneopentyl glycol diglycidyl ether, 1,3,5,6-tetraglycidyl-2,4-hexanediol, N,N,N',N'-tetraglycidyl-meta-xylene, 1,3-bis(N,N-diglycidylaminomethyl)cyclohexane, N,N,N',N'-tetraglycidyl-4,4'-diaminodiphenylmethane, 3-(N-propenyl-N-glycidyl)aminopropyl-trimethoxysilane, 3-(N,N-diglycidyl)aminobutyl-trimethoxysilane.

The above-mentioned epoxy compounds can improve the adhesion between the liquid crystal alignment layer and the substrate under the condition that the amount of the epoxy compound does not impact the required characteristics of the liquid crystal alignment layer. If the amount of the epoxy compound in the liquid crystal alignment solution is too much, the orientation performance of the liquid crystal alignment layer is reduced; if the amount of the epoxy compound in the liquid crystal alignment solution is not enough, the rubbing mura and particles occur in the liquid crystal alignment layer. Therefore, the concentration of the epoxy compound in the liquid crystal alignment solution with respect to the total weight of the liquid crystal alignment solution is preferably between 0.01 and 3 wt % and more preferably between 0.1 and 2 wt %.

The fabrication method of a liquid crystal display is described in the following.

(1) The liquid crystal alignment solution in accordance with the present invention is applied to a glass substrate by roll coating, spin coating or print coating. The glass substrate has a patterned transparent conductive film. A baking process is performed after the glass substrate is coated with the liquid crystal alignment solution, so that the organic solvent of the liquid crystal alignment solution is removed and the dehydration ring-closing reaction is performed on the acyclic polyamide acid to form a polyimide film. The baking temperature is between 80 and 300 degrees centigrade and preferably between 100 and 240 degrees centigrade, for example. The film thickness is preferably between 0.005 and 0.5 um.

(2) A rubbing process is performed, in a fixed direction, on the film by a roll wired with a cloth such as nylon or cotton, so that liquid crystal molecules will be oriented in the direction of rubbing. Thus, the substrate having the liquid crystal alignment layer is formed.

(3) A frame is coated on the substrate having the liquid crystal alignment layer, spacers are sprayed on another substrate having the liquid crystal alignment layer, and the above-mentioned two substrates are then formed together with the way that the rubbing directions are perpendicular with or parallel to each other. Thereafter, liquid crystal molecules are injected into the gap between two substrates and the injection hole is then sealed so as to form a liquid crystal display panel.

The following characteristics are generally used to evaluate a liquid crystal display device:

(1) Pre-Tilt Angle

A pre-tilt angle is measured by performing a crystal rotation method on the liquid crystal display panel which has been injected with liquid crystal molecules.

(2) Rubbing Property

A liquid crystal alignment solution is spin coated on an indium tin oxide (ITO) substrate. A baking process is then performed in an oven. Thereafter, a rubbing process is performed, in a fixed direction, 10 times under the conditions that the rotation speed is 1000 spins/min and the platform moving speed is 60 ms/sec. Afterwards, the rubbed surface is observed under a polarizing microscope.

(3) Voltage Holding Ratio (VHR)

Under an environmental temperature of 60 degrees centigrade, a DC voltage of 3V is applied to a liquid crystal display device in a pulse width of 60 μsec and a frequency of 60 Hz to measure the voltage holding ratio of the liquid crystal display device.

(4) Residual Direct Current (RDC)

Under an environmental temperature of 60 degrees centigrade, a DC voltage of 5V is applied to a liquid crystal display device for one hour, and then the DC voltage is interrupted to measure the residual DC voltage of the liquid crystal display device.

(5) Imidization Rate

A drying process is performed on a polymer or a liquid crystal alignment solution under reduced pressure at room temperature. The dried solids are dissolved in deuterated dimethyl sulfoxide, using tetramethyl silane as the internal standard, to measure the imidization rate with $^1$H-NMR (proton NMR) based on formula (II).

$$\text{Imidization rate}(\%)=(1-A^1/A^2\times\alpha)\times100 \qquad (II)$$

in which $A^1$ is an integration area of the peak at 10 ppm caused by protons of NH groups; $A^2$ is an integration area of the peak of the other protons; and $\alpha$ is a number ratio of the other protons to protons of NH groups in the polymer precursor (polyamide acid).

(6) Adhesion

A liquid crystal alignment solution is coated on an ITO substrate and the ITO substrate is then water boiled at 100 degrees centigrade for one hour. Thereafter, a cross cut method is performed with a 3M tape.

(7) Reliability

In a hot and humid environment (temperature is 50 degrees centigrade and the relative humidity is 90%), a voltage of 5V in a frequency of 60 Hz is applied to a liquid crystal display device for 500 hours. Thereafter, the liquid crystal display device is observed under a polarizing microscope.

The synthesis methods of the experimental group (polymers A1-A53 and B1-B40) and the control group (polymers a1-a5 and b1) are described in the following.

A tetracarboxylic acid dianhydride and a diamine compound are added subsequently to N-Methyl-2-pyrrolidone (ratios are shown in Tables 4 and 5) to form a solution with solids content of 25 wt %. The solution is reacted at 50-60 degrees centigrade for 4-5 hours and a polyamide acid is then obtained. Pyridine and acetic anhydride (the amount of the pyridine and acetic anhydride depends on the imidization rate) are added to the polyamide acid to carry out a dehydration ring-closing reaction at 100-110 degrees centigrade for 3-4 hours.

0.01-20 moles of the acetic anhydride are preferably used for every mole of repeating unit of the polyimide-polyamide acid, and 0.01-10 moles of the pyridine are preferably used for every mole of the acetic anhydride. For example, 0.1 mole of the pyridine and 0.2 mole of the acetic anhydride are used in the synthesis example 14 in Table 4.

The obtained solution is precipitated and purified by methanol. Thereafter, a drying process is performed under reduced pressure to obtain the polymers A1-A53, B1-B40, a1-a5 and b1 with intrinsic viscosities and imidization rates as shown in Tables 4 and 5.

The experimental methods of the experimental group and the control group are described in the following.

A solid polymer A and a solid polymer B (the ratio of A to B is fixed) are dissolved in γ-butyrolactone and N-methyl-2-pyrrolidone to form a solution with solids content of 6 wt %. The solution is filtered by a filter with 1 um diameter. The filtered solution is the liquid crystal alignment solution according to the present invention.

The liquid crystal alignment solution is applied to a glass substrate by a roller printer. A drying process is then performed with a heating plate at 200 degrees centigrade for 20 minutes to form a film with 0.05 um thickness. A rubbing process, in a fixed direction, is performed on the film under the conditions that the roller rotation speed is 1000 spins/min, the platform moving speed is 60 ms/sec and the penetration depth is 0.4 um.

A frame is coated on the substrate, and spacers are sprayed on another substrate. Thereafter, the above-mentioned two substrates are formed together with the way that the rubbing directions are perpendicular with each other. Afterwards, the liquid crystal molecules (ZLI-4792) are injected into the gap between two substrates and the injection hole is then sealed so as to form a liquid crystal display device.

The liquid crystal display device is evaluated with pre-tilt angle, rubbing property, voltage holding ratio, residual direct current, adhesion and reliability. The evaluation results are shown in Table 6.

TABLE 4

| Synthesis example | Diamine compound (mmole) | Tetracarboxylic acid dianhydride (mmole) | Imidization rate (%) | Intrinsic viscosity (dl/g) | Polymer |
|---|---|---|---|---|---|
| 1 | 2-1(5), 3-15(95) | 1-37(100) | 96 | 0.4 | B1 |
| 2 | 2-1(10), 3-15(90) | 1-37(100) | 98 | 0.4 | B2 |
| 3 | 2-1(14), 3-15(86) | 1-37(100) | 94 | 0.3 | B3 |
| 4 | 2-1(3), 2-2(7), 3-15(90) | 1-37(100) | 95 | 0.4 | B4 |
| 5 | 2-1(6), 2-26(3), 3-15(91) | 1-37(100) | 99 | 0.3 | B5 |
| 6 | 2-2(4), 3-15(96) | 1-37(100) | 98 | 0.2 | B6 |
| 7 | 2-2(6), 3-15(94) | 1-37(100) | 96 | 0.4 | B7 |
| 8 | 2-2(10), 3-15(90) | 1-37(100) | 97 | 0.3 | B8 |
| 9 | 2-3(5), 3-15(95) | 1-37(100) | 99 | 0.3 | B9 |
| 10 | 2-3(10), 3-15(90) | 1-37(100) | 93 | 0.4 | B10 |
| 11 | 2-26(5), 3-15(95) | 1-37(100) | 97 | 0.4 | B11 |
| 12 | 2-26(10), 3-15(90) | 1-37(100) | 95 | 0.3 | B12 |
| 13 | 2-26(15), 3-15(85) | 1-37(100) | 99 | 0.4 | B13 |
| 14 | 2-26(17), 3-15(83) | 1-37(100) | 100 | 0.2 | B14 |
| 15 | 2-1(5), 3-15(95) | 1-37(100) | 88 | 0.3 | B15 |
| 16 | 2-1(10), 3-15(90) | 1-37(100) | 89 | 0.4 | B16 |
| 17 | 2-1(14), 3-15(86) | 1-37(100) | 90 | 0.3 | B17 |
| 18 | 2-1(3), 2-2(7), 3-15(90) | 1-37(100) | 86 | 0.4 | B18 |
| 19 | 2-1(6), 2-26(3), 3-15(91) | 1-37(100) | 87 | 0.3 | B19 |
| 20 | 2-2(4), 3-15(96) | 1-37(100) | 89 | 0.4 | B20 |
| 21 | 2-2(6), 3-15(94) | 1-37(100) | 90 | 0.4 | B21 |
| 22 | 2-2(10), 3-15(90) | 1-37(100) | 88 | 0.3 | B22 |
| 23 | 2-3(5), 3-15(95) | 1-37(100) | 87 | 0.3 | B23 |
| 24 | 2-3(10), 3-15(90) | 1-37(100) | 86 | 0.3 | B24 |
| 25 | 2-26(5), 3-15(95) | 1-37(100) | 89 | 0.3 | B25 |
| 26 | 2-26(10), 3-15(90) | 1-37(100) | 87 | 0.2 | B26 |
| 27 | 2-26(15), 3-15(85) | 1-37(100) | 90 | 0.3 | B27 |
| 28 | 2-26(17), 3-15(83) | 1-37(100) | 88 | 0.4 | B28 |
| 29 | 2-1(10), 3-15(90) | 1-37(100) | 79 | 0.4 | B29 |
| 30 | 2-2(10), 3-15(90) | 1-37(100) | 80 | 0.4 | B30 |
| 31 | 2-2(6), 3-15(94) | 1-37(100) | 76 | 0.3 | B31 |
| 32 | 2-3(10), 3-15(90) | 1-37(100) | 79 | 0.2 | B32 |
| 33 | 2-1(10), 3-15(90) | 1-37(100) | 69 | 0.4 | B33 |
| 34 | 2-2(10), 3-15(90) | 1-37(100) | 70 | 0.3 | B34 |
| 35 | 2-2(6), 3-15(94) | 1-37(100) | 70 | 0.4 | B35 |
| 36 | 2-3(10), 3-15(90) | 1-37(100) | 68 | 0.3 | B36 |
| 37 | 2-1(10), 3-15(90) | 1-37(100) | 59 | 0.3 | B37 |
| 38 | 2-2(10), 3-15(90) | 1-37(100) | 60 | 0.2 | B38 |
| 39 | 2-2(6), 3-15(94) | 1-37(100) | 58 | 0.3 | B39 |
| 40 | 2-3(10), 3-15(90) | 1-37(100) | 60 | 0.3 | B40 |
| 41 | 2-13(10), 3-15(90) | 1-37(100) | 97 | 0.8 | b1 |

TABLE 5

| Synthesis example | Diamine compound (mmole) | Tetracarboxylic acid dianhydride (mmole) | Imidization rate (%) | Intrinsic viscosity (dl/g) | Polymer |
|---|---|---|---|---|---|
| 42 | 3-15(100) | 1-2(80), 1-37(20) | 20 | 0.82 | A1 |
| 43 | 3-15(100) | 1-25(80), 1-37(20) | 19 | 0.85 | A2 |
| 44 | 3-15(100) | 1-2(40), 1-25(40), 1-37(20) | 20 | 0.79 | A3 |
| 45 | 3-15(100) | 1-2(70), 1-37(30) | 29 | 0.86 | A4 |
| 46 | 3-15(100) | 1-25(70), 1-37(30) | 28 | 0.75 | A5 |
| 47 | 3-15(100) | 1-2(35), 1-25(35), 1-37(30) | 29 | 0.80 | A6 |
| 48 | 3-15(100) | 1-2(60), 1-37(40) | 38 | 0.77 | A7 |
| 49 | 3-15(100) | 1-25(60), 1-37(40) | 37 | 0.78 | A8 |
| 50 | 3-15(100) | 1-2(30), 1-25(30), 1-37(40) | 39 | 0.86 | A9 |
| 51 | 3-15(100) | 1-2(35), 1-25(25), 1-37(40) | 38 | 0.79 | A10 |
| 52 | 3-24(100) | 1-2(80), 1-37(20) | 20 | 0.75 | A11 |
| 53 | 3-24(100) | 1-25(80), 1-37(20) | 17 | 0.74 | A12 |
| 54 | 3-24(100) | 1-2(40), 1-25(40), 1-37(20) | 19 | 0.80 | A13 |
| 55 | 3-24(100) | 1-2(70), 1-37(30) | 30 | 0.77 | A14 |
| 56 | 3-24(100) | 1-25(70), 1-37(30) | 27 | 0.76 | A15 |
| 57 | 3-24(100) | 1-2(35), 1-25(35), 1-37(30) | 29 | 0.80 | A16 |
| 58 | 3-24(100) | 1-2(60), 1-37(40) | 38 | 0.75 | A17 |
| 59 | 3-24(100) | 1-25(60), 1-37(40) | 36 | 0.76 | A18 |
| 60 | 3-24(100) | 1-2(30), 1-25(30), 1-37(40) | 39 | 0.82 | A19 |
| 61 | 3-37(100) | 1-2(80), 1-37(20) | 20 | 0.73 | A20 |
| 62 | 3-37(100) | 1-25(80), 1-37(20) | 18 | 0.66 | A21 |
| 63 | 3-37(100) | 1-2(70), 1-25(10), 1-37(20) | 19 | 0.72 | A22 |
| 64 | 3-37(100) | 1-2(52), 1-25(28), 1-37(20) | 20 | 0.70 | A23 |
| 65 | 3-37(100) | 1-2(43), 1-25(37), 1-37(20) | 19 | 0.62 | A24 |
| 66 | 3-37(100) | 1-2(70), 1-37(30) | 30 | 0.71 | A25 |
| 67 | 3-37(100) | 1-25(70), 1-37(30) | 29 | 0.68 | A26 |
| 68 | 3-37(100) | 1-2(60), 1-25(10), 1-37(30) | 28 | 0.70 | A27 |
| 69 | 3-37(100) | 1-2(50), 1-25(20), 1-37(30) | 29 | 0.69 | A28 |
| 70 | 3-37(100) | 1-2(40), 1-25(30), 1-37(30) | 28 | 0.65 | A29 |
| 71 | 3-37(100) | 1-2(25), 1-25(45), 1-37(30) | 30 | 0.67 | A30 |
| 72 | 3-37(100) | 1-2(20), 1-25(50), 1-37(30) | 28 | 0.63 | A31 |
| 73 | 3-37(100) | 1-2(60), 1-37(40) | 39 | 0.69 | A32 |
| 74 | 3-37(100) | 1-25(60), 1-37(40) | 37 | 065 | A33 |
| 75 | 3-37(100) | 1-2(30), 1-25(30), 1-37(40) | 39 | 0.63 | A34 |
| 76 | 3-51(100) | 1-2(35), 1-25(25), 1-37(40) | 39 | 0.72 | A35 |
| 77 | 3-104(100) | 1-2(30), 1-25(30), 1-37(40) | 15 | 0.61 | A36 |
| 78 | 3-104(100) | 1-2(20), 1-37(80) | 19 | 0.63 | A37 |
| 79 | 3-104(100) | 1-2(80), 1-37(20) | 20 | 0.71 | A38 |
| 80 | 3-104(100) | 1-25(80), 1-37(20) | 18 | 0.65 | A39 |
| 81 | 3-104(100) | 1-2(40), 1-25(40), 1-37(20) | 19 | 0.64 | A40 |
| 82 | 3-104(100) | 1-2(45), 1-25(35), 1-37(20) | 20 | 0.59 | A41 |
| 83 | 3-104(100) | 1-2(70), 1-37(30) | 29 | 0.60 | A42 |
| 84 | 3-104(100) | 1-25(70), 1-37(30) | 29 | 0.62 | A43 |
| 85 | 3-104(100) | 1-2(35), 1-25(35), 1-37(30) | 29 | 0.61 | A44 |
| 86 | 3-104(100) | 1-2(40), 1-25(30), 1-37(30) | 27 | 0.59 | A45 |
| 87 | 3-104(100) | 1-2(30), 1-25(40), 1-37(30) | 30 | 0.63 | A46 |
| 88 | 3-104(100) | 1-2(60), 1-37(40) | 40 | 0.56 | A47 |
| 89 | 3-104(100) | 1-25(60), 1-37(40) | 38 | 0.59 | A48 |
| 90 | 3-104(100) | 1-2(20), 1-25(40), 1-37(40) | 39 | 0.64 | A49 |
| 91 | 3-104(100) | 1-2(15), 1-25(45), 1-37(40) | 37 | 0.58 | A50 |
| 92 | 3-104(100) | 1-2(30), 1-25(30), 1-37(40) | 39 | 0.62 | A51 |

TABLE 5-continued

| Synthesis example | Diamine compound (mmole) | Tetracarboxylic acid dianhydride (mmole) | Imidization rate (%) | Intrinsic viscosity (dl/g) | Polymer |
|---|---|---|---|---|---|
| 93 | 3-104(100) | 1-2(35), 1-25(25), 1-37(30) | 40 | 0.60 | A52 |
| 94 | 3-104(100) | 1-2(25), 1-25(20), 1-37(55) | 50 | 0.52 | A53 |
| 95 | 3-15(100) | 1-2(50), 1-25(50) | 0 | 1.5 | a1 |
| 96 | 3-24(100) | 1-2(50), 1-25(50) | 0 | 1.6 | a2 |
| 97 | 3-37(100) | 1-2(50), 1-25(50) | 0 | 1.3 | a3 |
| 98 | 3-104(100) | 1-2(50), 1-25(50) | 0 | 1.4 | a4 |
| 99 | 3-105(100) | 1-2(50), 1-25(50) | 0 | 1.4 | a5 |

TABLE 6

| Experimental group | Polymers (weight ratio) | Pre-tilt angle | VHR (%) | RDC (V) | Reliability | Adhesion | Rubbing |
|---|---|---|---|---|---|---|---|
| 1 | B1(1) + A29(4) | 3.2 | 97.2 | 0.33 | Excellent | Excellent | Excellent |
| 2 | B2(1) + A29(4) | 4.8 | 96.8 | 0.45 | Excellent | Excellent | Excellent |
| 3 | B3(1) + A29(4) | 6.0 | 97.6 | 0.53 | Excellent | Excellent | Excellent |
| 4 | B4(1) + A29(4) | 4.5 | 98.9 | 0.21 | Excellent | Excellent | Excellent |
| 5 | B5(1) + A29(4) | 4.3 | 95.8 | 0.39 | Excellent | Excellent | Excellent |
| 6 | B6(1) + A29(4) | 4.0 | 98.6 | 0.25 | Excellent | Excellent | Excellent |
| 7 | B7(1) + A29(4) | 4.8 | 94.6 | 0.49 | Excellent | Excellent | Excellent |
| 8 | B8(1) + A29(4) | 5.5 | 96.7 | 0.32 | Excellent | Excellent | Excellent |
| 9 | B9(1) + A29(4) | 4.7 | 98.6 | 0.50 | Excellent | Excellent | Excellent |
| 10 | B10(1) + A29(4) | 6.4 | 97.6 | 0.24 | Excellent | Excellent | Excellent |
| 11 | B11(1) + A29(4) | 3.8 | 95.9 | 0.35 | Excellent | Excellent | Excellent |
| 12 | B12(1) + A29(4) | 5.0 | 98.1 | 0.23 | Excellent | Excellent | Excellent |
| 13 | B13(1) + A29(4) | 6.5 | 99.0 | 0.42 | Excellent | Excellent | Excellent |
| 14 | B14(1) + A29(4) | 6.8 | 96.8 | 0.32 | Excellent | Excellent | Excellent |
| 15 | B15(1) + A29(4) | 3.0 | 95.9 | 0.42 | Excellent | Excellent | Excellent |
| 16 | B16(1) + A29(4) | 4.6 | 96.7 | 0.49 | Excellent | Excellent | Excellent |
| 17 | B17(1) + A29(4) | 5.8 | 98.1 | 0.39 | Excellent | Excellent | Excellent |
| 18 | B18(1) + A29(4) | 4.3 | 95.3 | 0.44 | Excellent | Excellent | Excellent |
| 19 | B19(1) + A29(4) | 4.1 | 98.1 | 0.35 | Excellent | Excellent | Excellent |
| 20 | B20(1) + A29(4) | 3.8 | 96.4 | 0.31 | Excellent | Excellent | Excellent |
| 21 | B21(1) + A29(4) | 4.6 | 98.6 | 0.44 | Excellent | Excellent | Excellent |
| 22 | B22(1) + A29(4) | 5.3 | 80.1 | 0.32 | Fair | Excellent | Excellent |
| 23 | B23(1) + A29(4) | 4.5 | 83.2 | 0.53 | Fair | Excellent | Excellent |
| 24 | B24(1) + A29(4) | 6.2 | 91.0 | 0.46 | Good | Excellent | Excellent |
| 25 | B25(1) + A29(4) | 3.6 | 89.5 | 0.41 | Good | Excellent | Excellent |
| 26 | B26(1) + A29(4) | 4.8 | 96.3 | 0.26 | Excellent | Excellent | Excellent |
| 27 | B27(1) + A29(4) | 6.3 | 96.1 | 0.35 | Excellent | Excellent | Excellent |
| 28 | B28(1) + A29(4) | 6.6 | 78.6 | 0.58 | Fair | Excellent | Excellent |
| 29 | B29(1) + A29(4) | 4.5 | 83.1 | 0.37 | Fair | Excellent | Excellent |
| 30 | B30(1) + A29(4) | 5.2 | 91.3 | 0.39 | Good | Excellent | Excellent |
| 31 | B31(1) + A29(4) | 5.0 | 91.0 | 0.52 | Good | Excellent | Excellent |
| 32 | B32(1) + A29(4) | 6.2 | 96.4 | 0.41 | Excellent | Excellent | Excellent |
| 33 | B33(1) + A29(4) | 4.3 | 97.0 | 0.36 | Excellent | Excellent | Excellent |
| 34 | B34(1) + A29(4) | 5.0 | 96.3 | 0.43 | Excellent | Excellent | Excellent |
| 35 | B35(1) + A29(4) | 4.8 | 97.2 | 0.52 | Excellent | Excellent | Excellent |
| Experimental group | Polymers (wt %) | Pre-tilt angle | VHR (%) | RDC (V) | Reliability | Adhesion | Rubbing property |
| 36 | B36(1) + A29(4) | 6.0 | 98.1 | 0.41 | Excellent | Excellent | Excellent |
| 37 | B37(1) + A29(4) | 4.0 | 96.1 | 0.32 | Excellent | Excellent | Excellent |
| 38 | B38(1) + A29(4) | 4.7 | 96.8 | 0.33 | Excellent | Excellent | Excellent |
| 39 | B39(1) + A29(4) | 4.3 | 97.0 | 0.51 | Excellent | Excellent | Excellent |
| 40 | B40(1) + A29(4) | 5.5 | 96.5 | 0.36 | Excellent | Excellent | Excellent |

TABLE 6-continued

| | | Pre-tilt angle | VHR (%) | RDC (V) | Reliability | Adhesion | Rubbing property |
|---|---|---|---|---|---|---|---|
| 41 | B21(1) + A1(4) | 4.5 | 90.2 | 0.32 | Good | Excellent | Excellent |
| 42 | B21(1) + A2(4) | 4.4 | 90.1 | 0.53 | Good | Excellent | Excellent |
| 43 | B21(1) + A3(4) | 4.5 | 93.2 | 0.46 | Excellent | Excellent | Excellent |
| 44 | B21(1) + A4(4) | 4.6 | 95.2 | 0.35 | Excellent | Excellent | Excellent |
| 45 | B21(1) + A5(4) | 4.3 | 94.3 | 0.46 | Excellent | Excellent | Excellent |
| 46 | B21(1) + A6(4) | 4.5 | 95.2 | 0.52 | Excellent | Excellent | Excellent |
| 47 | B21(1) + A7(4) | 4.6 | 97.3 | 0.32 | Excellent | Excellent | Excellent |
| 48 | B21(1) + A8(4) | 4.2 | 96.8 | 0.31 | Excellent | Excellent | Excellent |
| 49 | B21(1) + A9(4) | 4.3 | 97.2 | 0.48 | Excellent | Excellent | Excellent |
| 50 | B21(1) + 10(4) | 4.6 | 96.5 | 0.38 | Excellent | Excellent | Excellent |
| 51 | B21(1) + A11(4) | 4.5 | 90.2 | 0.46 | Good | Excellent | Excellent |
| 52 | B21(1) + A12(4) | 4.4 | 91.2 | 0.47 | Good | Excellent | Excellent |
| 53 | B21(1) + A13(4) | 4.6 | 89.2 | 0.53 | Good | Excellent | Excellent |
| 54 | B21(1) + A14(4) | 4.5 | 95.2 | 0.60 | Excellent | Excellent | Excellent |
| 55 | B21(1) + A15(4) | 4.3 | 93.5 | 0.29 | Excellent | Excellent | Excellent |
| 56 | B21(1) + A16(4) | 4.2 | 95.1 | 0.23 | Excellent | Excellent | Excellent |
| 57 | B21(1) + A17(4) | 4.5 | 97.2 | 0.53 | Excellent | Excellent | Excellent |
| 58 | B21(1) + A18(4) | 4.3 | 96.5 | 0.30 | Excellent | Excellent | Excellent |
| 59 | B21(1) + A19(4) | 4.4 | 98.3 | 0.42 | Excellent | Excellent | Excellent |
| 60 | B21(1) + A20(4) | 4.5 | 90.2 | 0.32 | Good | Excellent | Excellent |
| 61 | B21(1) + A21(4) | 4.2 | 90.5 | 0.35 | Good | Excellent | Excellent |
| 62 | B21(1) + A22(4) | 4.5 | 90.6 | 0.41 | Good | Excellent | Excellent |
| 63 | B21(1) + A23(4) | 4.6 | 92.0 | 0.50 | Good | Excellent | Excellent |
| 64 | B21(1) + A24(4) | 4.3 | 91.0 | 0.32 | Good | Excellent | Excellent |
| 65 | B21(1) + A25(4) | 4.4 | 94.2 | 0.51 | Excellent | Excellent | Excellent |
| 66 | B21(1) + A26(4) | 4.5 | 96.1 | 0.33 | Excellent | Excellent | Excellent |
| 67 | B21(1) + A27(4) | 4.3 | 95.2 | 0.38 | Excellent | Excellent | Excellent |
| 68 | B21(1) + A28(4) | 4.5 | 94.3 | 0.46 | Excellent | Excellent | Excellent |
| 69 | B21(1) + A29(4) | 4.2 | 96.1 | 0.63 | Excellent | Excellent | Excellent |
| 70 | B21(1) + A30(4) | 4.7 | 93.5 | 0.21 | Excellent | Excellent | Excellent |
| 71 | B21(1) + A31(4) | 4.6 | 94.2 | 0.36 | Excellent | Excellent | Excellent |
| 72 | B21(1) + A32(4) | 4.5 | 95.2 | 0.42 | Excellent | Excellent | Excellent |
| 73 | B21(1) + A33(4) | 4.5 | 98.2 | 0.33 | Excellent | Excellent | Excellent |
| 74 | B21(1) + A34(4) | 4.3 | 97.3 | 0.39 | Excellent | Excellent | Excellent |
| 75 | B21(1) + A35(4) | 4.5 | 96.5 | 0.56 | Excellent | Excellent | Excellent |
| 76 | B21(1) + A36(4) | 4.6 | 88.6 | 0.38 | Good | Fair | Excellent |
| 77 | B21(1) + A37(4) | 4.5 | 90.2 | 0.37 | Good | Fair | Excellent |
| 78 | B21(1) + A38(4) | 4.3 | 89.5 | 0.25 | Good | Fair | Excellent |
| 79 | B21(1) + A39(4) | 4.4 | 90.1 | 0.21 | Good | Fair | Excellent |
| 80 | B21(1) + A40(4) | 4.4 | 89.8 | 0.36 | Good | Fair | Excellent |
| 81 | B21(1) + A41(4) | 4.3 | 90.6 | 0.36 | Good | Fair | Excellent |
| 82 | B21(1) + A42(4) | 4.5 | 93.4 | 0.33 | Excellent | Fair | Excellent |
| 83 | B21(1) + A43(4) | 4.6 | 94.5 | 0.45 | Excellent | Fair | Excellent |
| 84 | B21(1) + A44(4) | 4.6 | 96.3 | 0.26 | Excellent | Fair | Excellent |
| 85 | B21(1) + A45(4) | 4.5 | 95.4 | 0.24 | Excellent | Fair | Excellent |
| 86 | B21(1) + A46(4) | 4.3 | 93.5 | 0.31 | Excellent | Fair | Excellent |
| 87 | B21(1) + A47(4) | 4.5 | 98.4 | 0.27 | Excellent | Fair | Excellent |
| 88 | B21(1) + A48(4) | 4.4 | 97.6 | 0.61 | Excellent | Fair | Excellent |
| 89 | B21(1) + A49(4) | 4.6 | 98.6 | 0.34 | Excellent | Fair | Excellent |
| 90 | B21(1) + A50(4) | 4.2 | 96.8 | 0.51 | Excellent | Fair | Excellent |
| 91 | B21(1) + A51(4) | 4.2 | 98.5 | 0.32 | Excellent | Fair | Excellent |
| 92 | B21(1) + A52(4) | 4.5 | 96.9 | 0.30 | Excellent | Fair | Excellent |
| 93 | B21(1) + A53(4) | 4.3 | 94.6 | 0.42 | Excellent | Fair | Excellent |
| Control group | Polymers (wt %) | Pre-tilt angle | VHR (%) | RDC (V) | Reliability | Adhesion | Rubbing property |
| 94 | b1(1) + a1(4) | 4.3 | 85.3 | 0.52 | Fair | Excellent | Good |
| 95 | b1(1) + a2(4) | 4.2 | 88.1 | 0.53 | Good | Excellent | Good |
| 96 | b1(1) + a3(4) | 4.5 | 89.2 | 0.42 | Good | Excellent | Good |
| 97 | b1(1) + a4(4) | 4.6 | 82.1 | 0.63 | Fair | Excellent | Good |
| 98 | b1(1) + a5(4) | 4.3 | 83.5 | 0.72 | Fair | Excellent | Good |

In summary, because the first liquid crystal alignment solution in accordance with the present invention has the polyimide-polyamide acids with two different imidization rates, the formed liquid crystal display device using the first liquid crystal alignment solution has the better rating after being evaluated with pre-tilt angle, rubbing property, voltage holding ratio, residual direct current, adhesion and reliability.

This invention has been disclosed above in the preferred embodiments, but is not limited to those. It is known to persons skilled in the art that some modifications and innovations may be made without departing from the spirit and scope of this invention. Hence, the scope of this invention should be defined by the following claims.

What is claimed is:
1. A liquid crystal alignment solution, comprising:
a first polyimide-polyamide acid represented by formula (A),

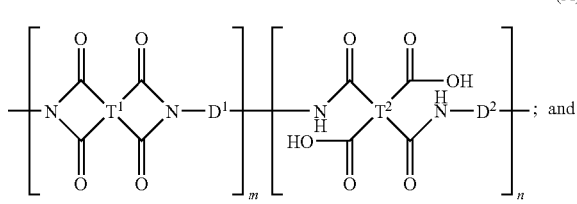

a second polyimide-polyamide acid represented by formula (B),

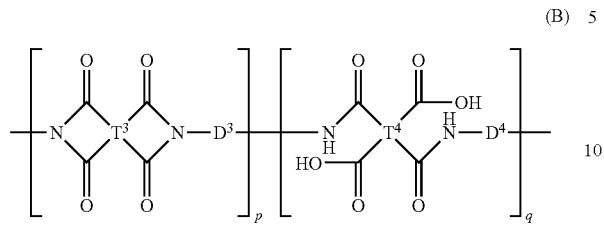

wherein
a weight ratio of the first polyimide-polyamide acid to the second polyimide-polyamide acid is between 5:95 and 95:5;
$T^1$, $T^2$, $T^3$ and $T^4$ are each independently a tetravalent residue of a tetracarboxylic acid dianhydride;
m, n, p and q are each independently an positive integer, wherein $m/(m+n) \leqq 0.5$ and $p/(p+q) \geqq 0.5$;
$D^1$, $D^2$, $D^3$, and $D^4$ are each independently a divalent residue of a diamine; and
at least one of $D^3$ and $D^4$ is selected from the group consisting of formulae (2) to (4),

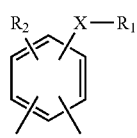  (2)

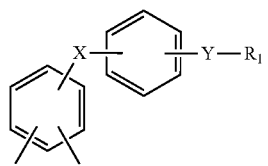  (3)

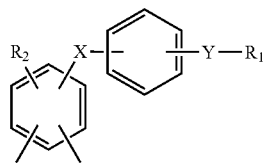  (4)

wherein
$R_1$ is a monovalent $C_{4-40}$ alicyclic group or a monovalent $C_{8-20}$ aliphatic group;
$R_2$ is a halogen atom or a monovalent group;
X is —O—; and
Y is a divalent group selected from the group consisting of —O—, —NH—, —S—, —CO—, —COO—, —OCO—, —NHCO— and —CONH—.

2. The liquid crystal alignment solution according to claim 1, wherein $(m+p)/(m+n+p+q) \geqq 0.2$.

3. The liquid crystal alignment solution according to claim 1, wherein at least one of $D^3$ and $D^4$ is represented by formulae (3), wherein $R_1$ is monovalent $C_{8-20}$ aliphatic group; X and Y are —O—.

4. The liquid crystal alignment solution according to claim 3, wherein $T^1$, $T^2$, $T^3$ and $T^4$ are each independently selected from the group consisting of the residues of formulae (10) to (27)

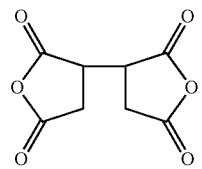 (10)

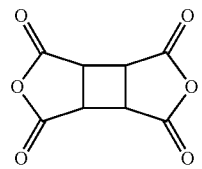 (11)

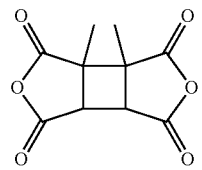 (12)

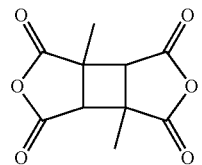 (13)

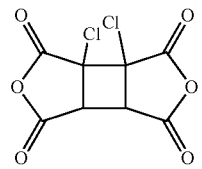 (14)

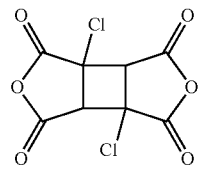 (15)

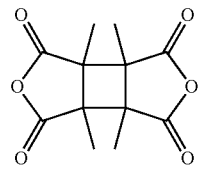 (16)

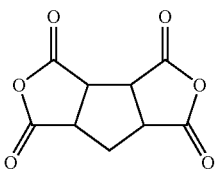 (17)

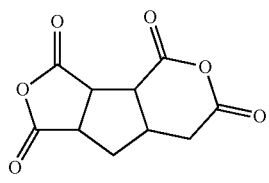 (18)

(19) 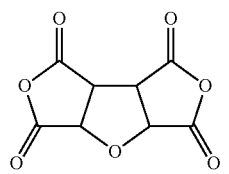
(20) 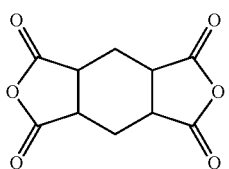
(21) 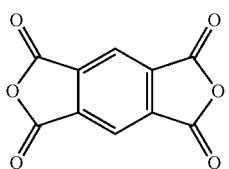
(22) 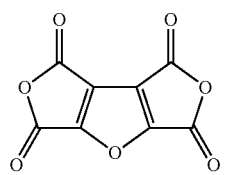
(23) 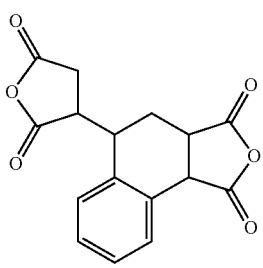
(24) 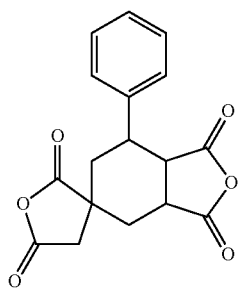
(25) 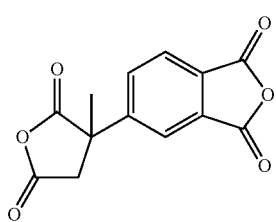
(26) 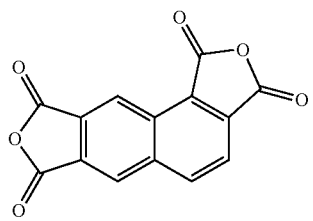
(27) 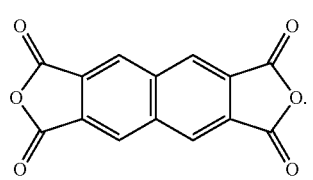
5. The liquid crystal alignment solution according to claim 4, wherein $D^1$ and $D^2$ are each independently selected from the group consisting of the residues of formulae (28) to (78)
(28) 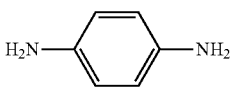
(29) 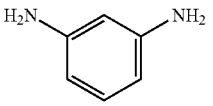
(30) 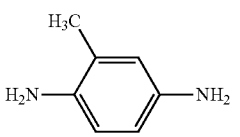
(31) 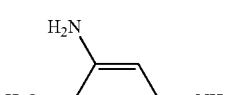
(32) 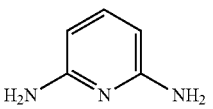
(33) 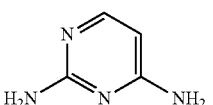
(34) 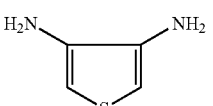
(35) 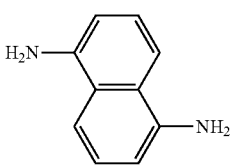

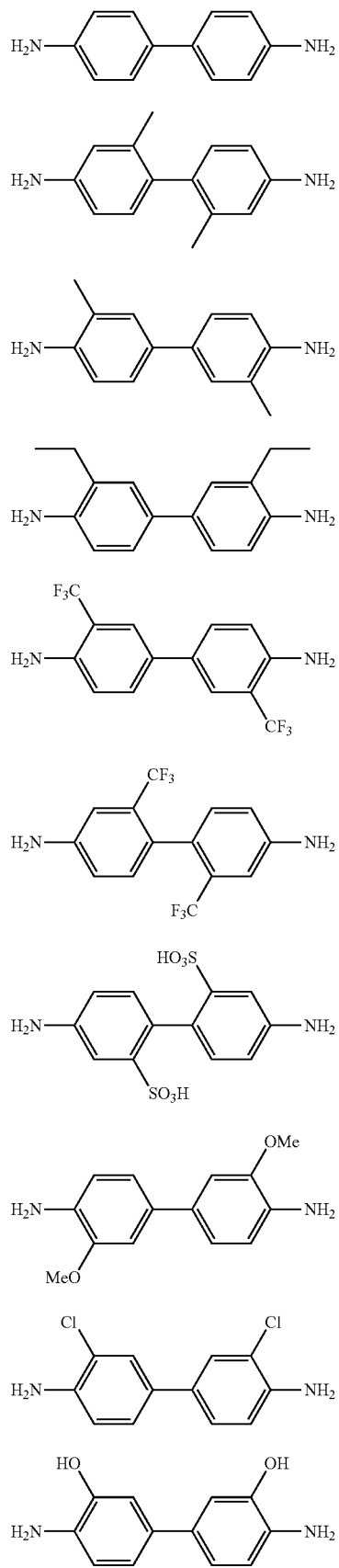
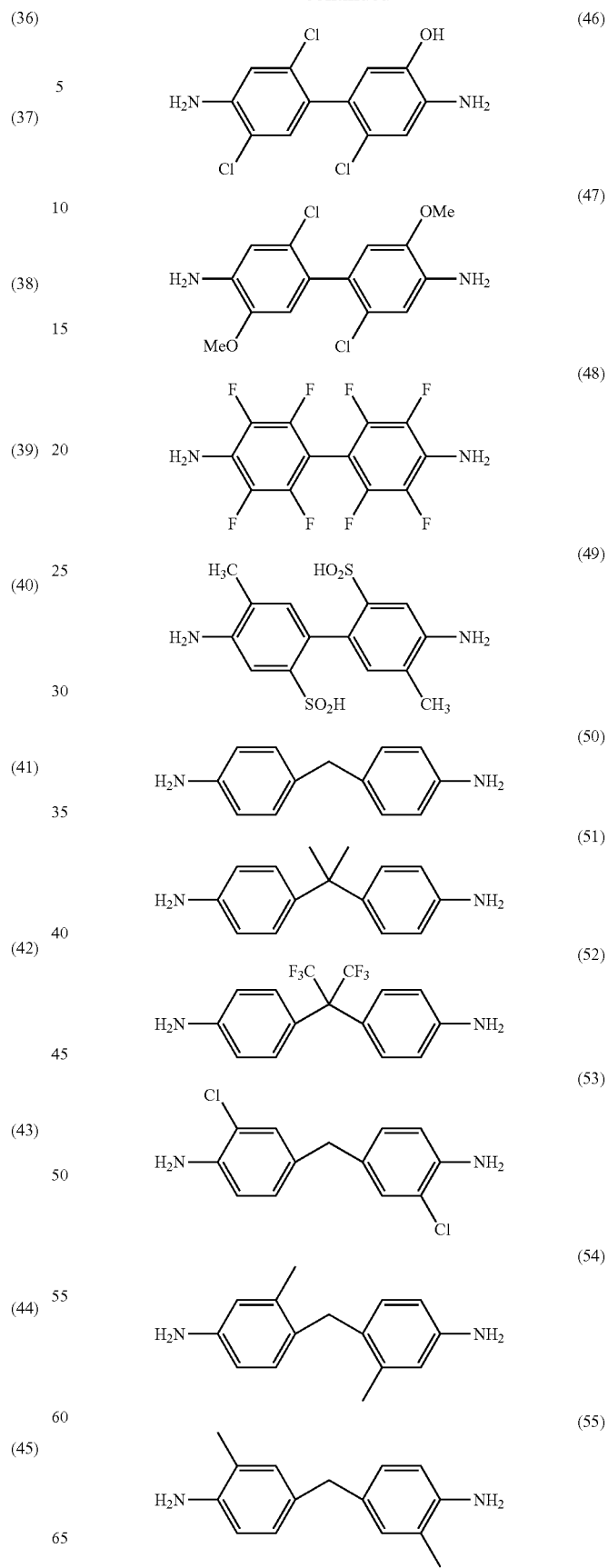

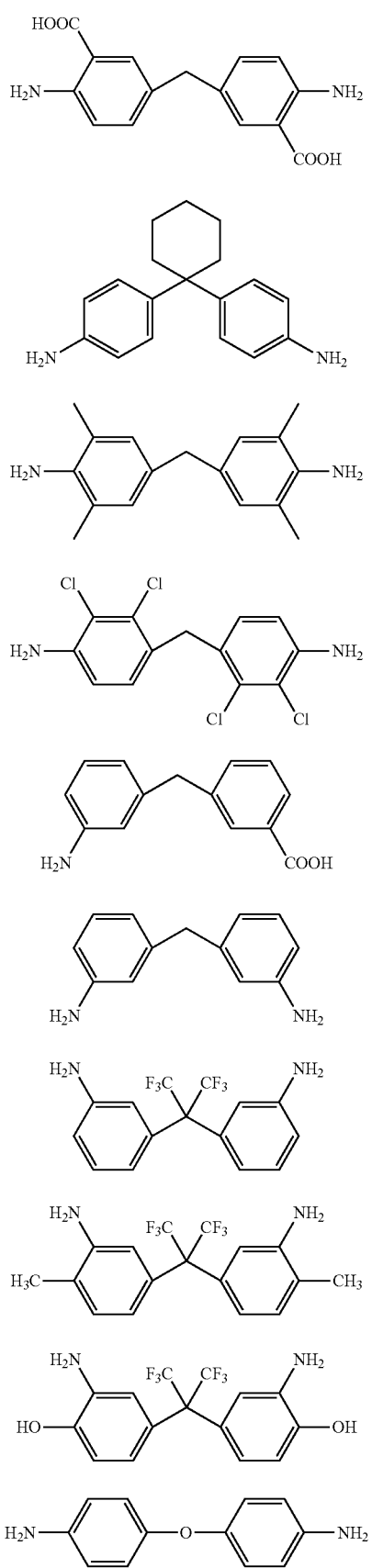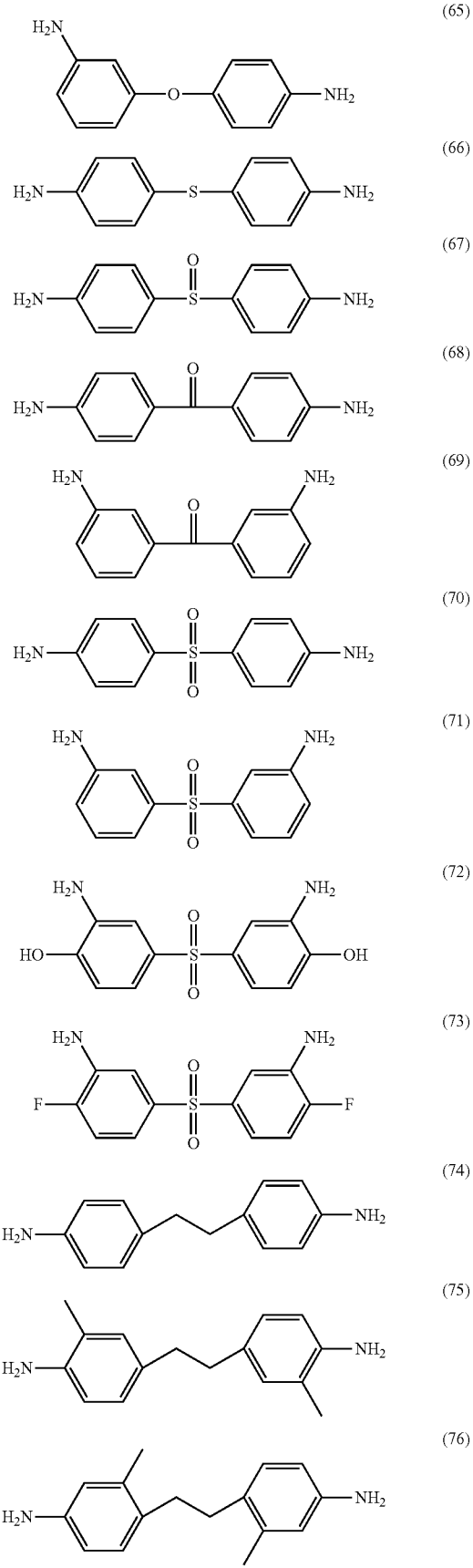

(77)

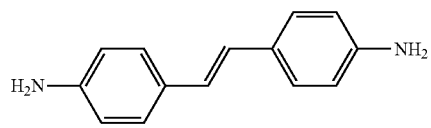

(78)

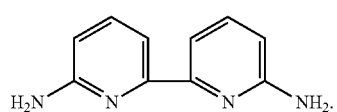

6. The liquid crystal alignment solution according to claim 3, wherein T1, T2, T3 and T4 are each independently selected from the group consisting of the residues of formulae (11), (21) and (23)

(11)

(21)

(23)

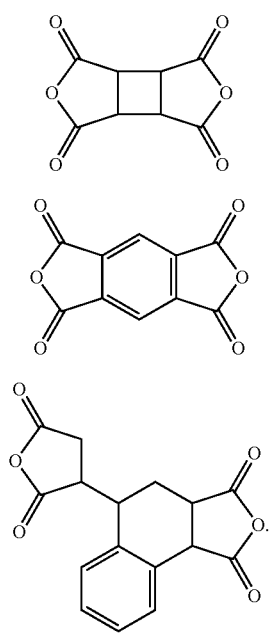

7. The liquid crystal alignment solution according to claim 6, wherein $D^1$ and $D^2$ are each independently selected from the group consisting of the residues of formulae (28), (37), (50) and (64)

(28)

(37)

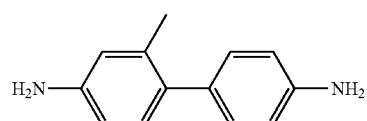

(50)

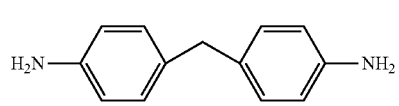

(64)

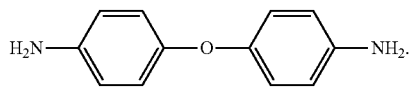

8. A liquid crystal alignment solution, comprising:
a first polyimide-polyamide acid represented by formula (A), (A)

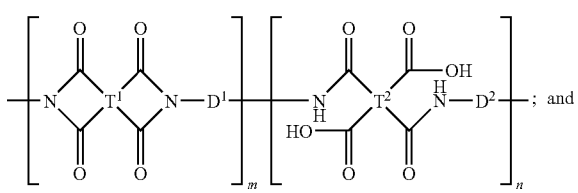

a second polyimide-polyamide acid represented by formula (B), (B)

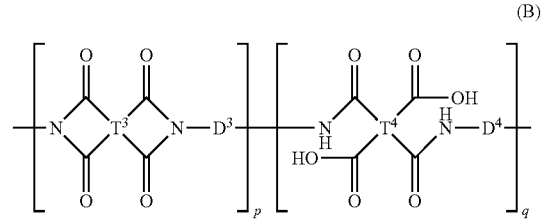

wherein
a weight ratio of the first polyimide-polyamide acid to the second polyimide-polyamide acid is between 5:95 and 95:5;
$T^1$, $T^2$, $T^3$ and $T^4$ are each independently selected from the group consisting of the residues of formulae (10) to (27)

(10)

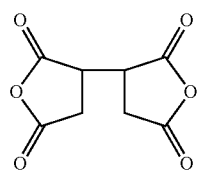

(11)

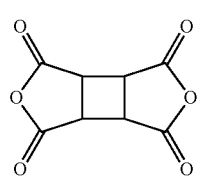

(12)

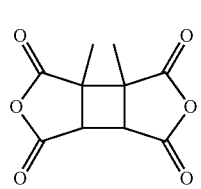

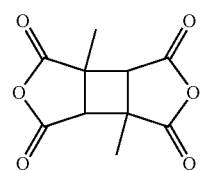
(13)
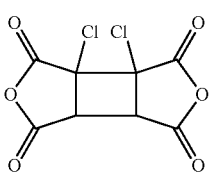
(14)
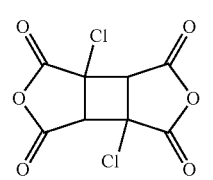
(15)
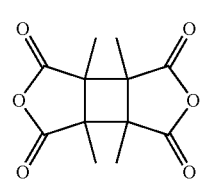
(16)
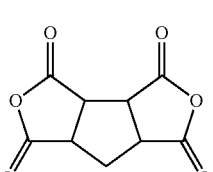
(17)
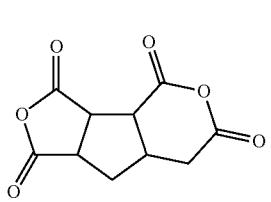
(18)
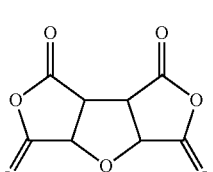
(19)
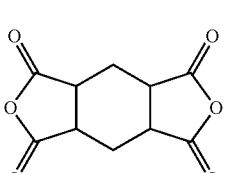
(20)
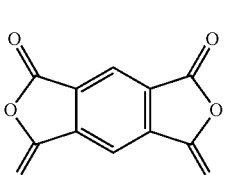
(21)
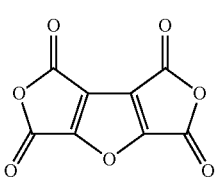
(22)
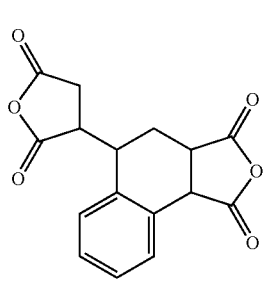
(23)
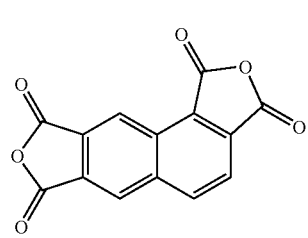
(24)
(25)
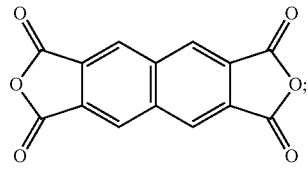
(26)
(27)

m, n, p and q are each independently an positive integer, wherein m/(m+n)≦0.5 and p/(p+q)≧0.5;

$D^1$, $D^2$, $D^3$, and $D^4$ are each independently a divalent residue of a diamine; and at least one of $D^3$ and $D^4$ is selected from the group consisting of formulae (2) to (4),

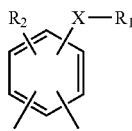

(2)

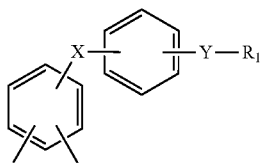

(3)

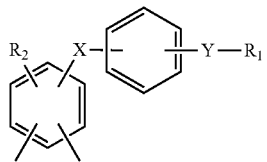

(4)

wherein $R_1$ is a monovalent $C_{4\text{-}40}$ alicyclic group or a monovalent $C_{8\text{-}20}$ aliphatic group;

$R_2$ is a halogen atom or a monovalent group;

X is —O—; and

Y is a divalent group selected from the group consisting of —O—, —NH—, —S—, —CO—, —COO—, —OCO—, —NHCO— and —CONH—.

* * * * *